United States Patent [19]

Ardon et al.

[11] Patent Number: 4,583,218

[45] Date of Patent: Apr. 15, 1986

[54] CONTROL COMMUNICATION IN A SWITCHING SYSTEM HAVING CLUSTERED REMOTE SWITCHING MODULES

[75] Inventors: Menachem T. Ardon, Naperville; James C. Kennedy, St. Charles; Douglas S. Sand, Naperville; Lawrence J. Trimnell, Wheaton; Meyer J. Zola, Oak Park, all of Ill.

[73] Assignee: AT&T Bell Laboratories, Murray Hill, N.J.

[21] Appl. No.: 493,742

[22] Filed: May 11, 1983

[51] Int. Cl.$^4$ ............................................. H04Q 11/04
[52] U.S. Cl. ........................................... 370/58; 370/56
[58] Field of Search ................. 370/58, 110.1, 66, 56; 179/18 R, 18 ES, 18 EA, 18 FC

[56] References Cited

U.S. PATENT DOCUMENTS

| | | | |
|---|---|---|---|
| 3,217,109 | 11/1965 | Abert | 179/18 |
| 3,629,511 | 12/1971 | Wolf | 179/18 |
| 3,723,654 | 3/1973 | Bunce et al. | 179/18 AD |
| 4,196,316 | 4/1980 | McEowen et al. | 179/18 AD |
| 4,258,231 | 3/1981 | Lenz et al. | 179/18 ES |
| 4,280,217 | 7/1981 | Hafer et al. | 370/63 |
| 4,317,962 | 3/1982 | Cox et al. | 370/110.1 |
| 4,322,843 | 3/1982 | Beuscher et al. | 370/58 |
| 4,327,436 | 4/1982 | Ohaga et al. | 370/110.1 |
| 4,382,294 | 5/1983 | Beuscher et al. | 370/58 |
| 4,385,380 | 5/1983 | Rees et al. | 179/18 FC |
| 4,403,370 | 9/1983 | Canniff | 370/58 |

OTHER PUBLICATIONS

S. W. Anderes et al., "GTD-5 EAX-Digital Remote Units", *GTE Automatic Electric Journal*, Jan.-Feb. 1981, pp. 8-15.
S. Cznarnecki and J. Eddy, "Adaptation of the GTD-5 EAX for International Applications", *GTE Automatic Electric Journal*, Sep.-Oct. 1981, pp. 156-163.
S. E. Puccini and R. W. Wolf, "Architecture of GTD-5 EAX Digital Family", *IEEE*, 1980, pp. 18.2.1-18.2.8.
S. E. Puccini et al., "GTD-5 EAX-Digital Remote Units", *GTE Automatic Electric Journal*.
"No. 10A Remote Switching System: System Overview", N. B. Abbott, K. J. S. Chadha, D. P. Smith, and T. F. Wickham, *The Bell System Technical Journal*, vol. 61, Apr. 1982, pp. 391-417.
"No. 10A Remote Switching System: Control-Complex Architecture and Circuit Design", R. K. Nichols and T. J. J. Starr, *The Bell System Technical Journal*, vol. 61, Apr. 1982, pp. 419-450.
"No. 10A Remote Switching System: Host Software", by D. W. Brown, J. J. Driscoll, and F. M. Lax, *The Bell System Technical Journal*, vol. 61, Apr. 1982, pp. 491-524.
"No. 10A Remote Switching System: System Maintenance," F. H. Keeve, J. C. Martin, and T. L. McRoberts, *The Bell System Technical Journal*, vol. 61, Apr. 1982, pp. 597-625.

*Primary Examiner*—Douglas W. Olms
*Assistant Examiner*—Curtis Kuntz
*Attorney, Agent, or Firm*—Ross T. Watland; Kenneth H. Samples

[57] ABSTRACT

An arrangement comprising a host switching system and a number of remote switching modules which are directly interconnected such that voice and data traffic as well as control information can be conveyed between modules without being routed through the host system network. The arrangement allows the integrated standalone operation of the remote switching modules and advantageously reduces traffic through the host system network during normal operation.

23 Claims, 21 Drawing Figures

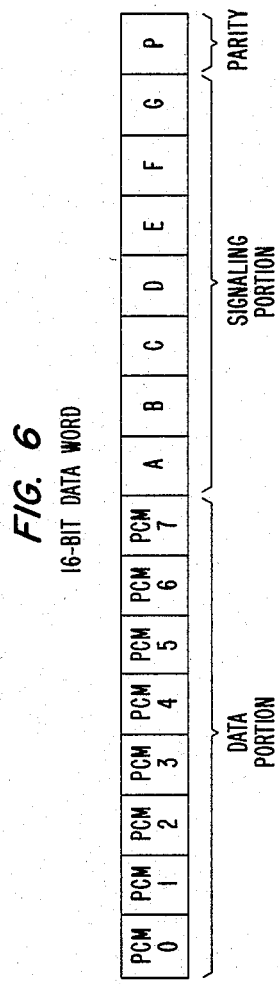

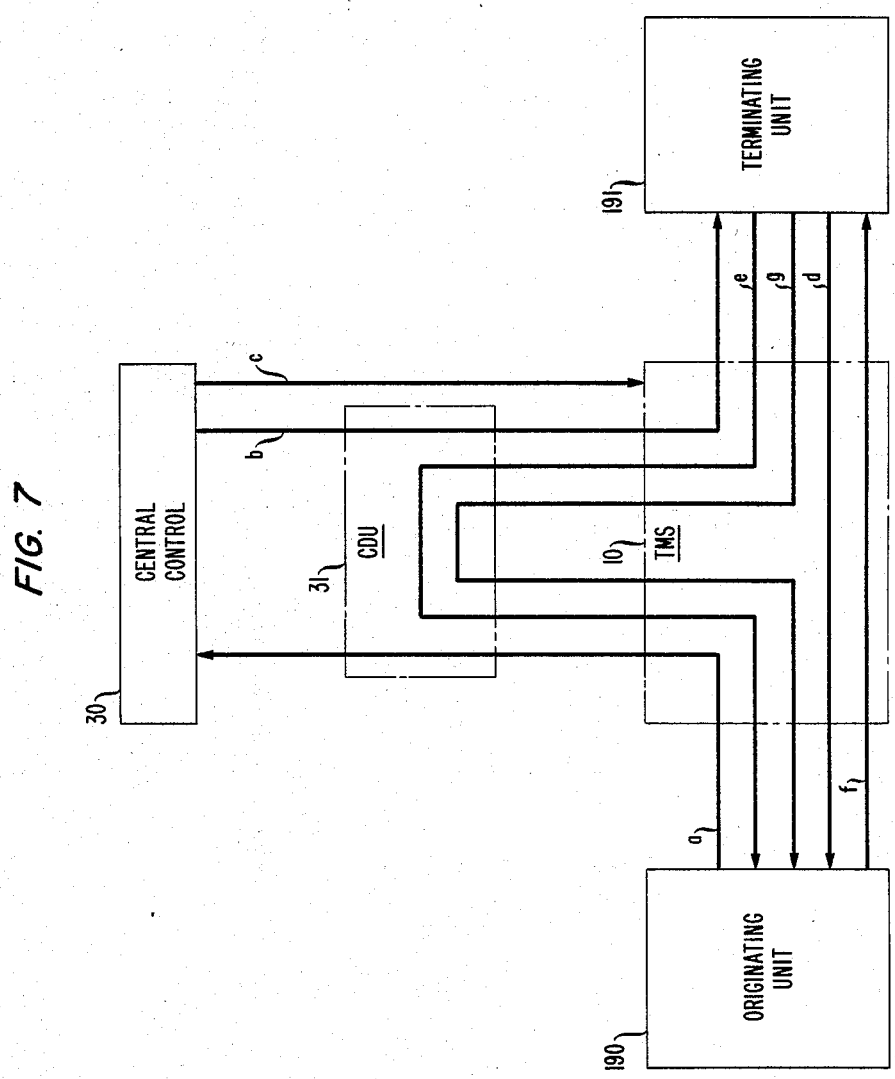

FORMAT ON TIME MULTIPLEXED LINES 341, 342 AND 588, 589

FORMAT ON DIGITAL TRANSMISSION FACILITY 421

A-E BITS FOR OTHER 23 CHANNELS, A EVERY 12 FRAMES, B-E EVERY 24 FRAMES.

CONTROL COMMUNICATION IN A SWITCHING SYSTEM HAVING CLUSTERED REMOTE SWITCHING MODULES

CROSS-REFERENCE TO RELATED APPLICATIONS

This application is related to the application of M. M. Chodrow, B. T. Sander, Jr., C. H. Sharpless, and E. J. Theriot, Ser. No. 493,683 filed May 11, 1983 entitled, "Switching System Having Remote Switching Capability", the application of M. T. Ardon, J. C. Kennedy, D. S. Sand, L. J. Trimnell, and M. J. Zola, Ser. No. 493,741 filed May 11, 1983 entitled, "Channel Selection in a Switching System Having Clustered Remote Switching Modules", and the application of J. C. Kennedy, L. J. Trimnell, and M. J. Zola, Ser. No. 493,682, filed May 11, 1983 entitled, "Switching System Having Selectively Interconnected Remote Switching Modules", which applications are assigned to the assignee of the present invention.

TECHNICAL FIELD

This invention relates to switching systems and more particularly, to switching systems having a remote switching capability.

BACKGROUND OF THE INVENTION

It is desirable to provide the features and advantages associated with stored program controlled switching to small communities. However, many small communities cannot economically justify the installation of independent, stored program-controlled systems. This situation has led to the development of systems in which a remote switching network can be controlled over a communication link by the central control of a host electronic switching system. One such system, the Western Electric No. 10A Remote Switching System (RSS) described in the *Bell System Technical Journal*, Vol. 61, No. 4, April 1982, can serve up to 2048 lines and has a stand-alone capability where basic service is maintained for intra-RSS calls in the event of a failure of the host system or the communication link between the host and remote units. The economic advantages involved in sharing a host system central control can also be realized by installing several remote switching systems in a larger community having more lines than can be accommodated by a single remote system. However, installing separate remote systems to serve a single community may have several disadvantages. When one of the links to the host system fails, stand-alone operation of separate remote systems may result in the isolation of highly interactive portions of the community. Further, voice and data traffic among the separate remote systems must be conveyed via the host system network. The resulting increase in traffic through the host system network increases the number of the expensive transmission facilities required to connect the host system to separate remote units and may make impractical the connection of such remote units to an available host system network which is already operating near its maximum capacity.

In view of the foregoing, a recognized problem in the art is providing remote switching service to a community having more lines than are accommodated by a single remote system while avoiding the isolation of different parts of the community during stand-alone operation and without unnecessarily routing voice and data traffic through the host system network during normal operation.

SUMMARY OF THE INVENTION

The aforementioned problem is advantageously solved and a technical advance is achieved in accordance with the principles of the invention in an arrangement wherein a number of remote switching modules in a grouping referred to as a cluster herein are directly interconnected such that intracluster voice and data traffic can be directly conveyed between modules rather than being routed through the host system network and wherein control information can also be conveyed among the modules via the direct interconnections therebetween to allow the integrated, stand-alone operation of the entire cluster.

An arrangement in accordance with the present invention comprises a host switching system and first and second remote switching modules. The host system is connected to each of the remote switching modules and in addition the remote switching modules are interconnected. The first remote switching module transmits control information on the connection between remote switching modules. The second remote switching module, which includes a number of peripheral circuits, receives control information on the connection between remote switching modules and responds by selectively establishing communication paths among the peripheral circuits and the connection between remote switching modules.

BRIEF DESCRIPTION OF THE DRAWING

A more complete understanding of the present invention may be obtained from a consideration of the following description when read in conjunction with the drawing in which:

FIG. 6 is a diagram of the data word format utilized in the system of FIG. 2;

FIG. 7 is a functional diagram of the communication sequence required for call setup in the system of FIG. 2;

GENERAL DESCRIPTION

Figure 1:
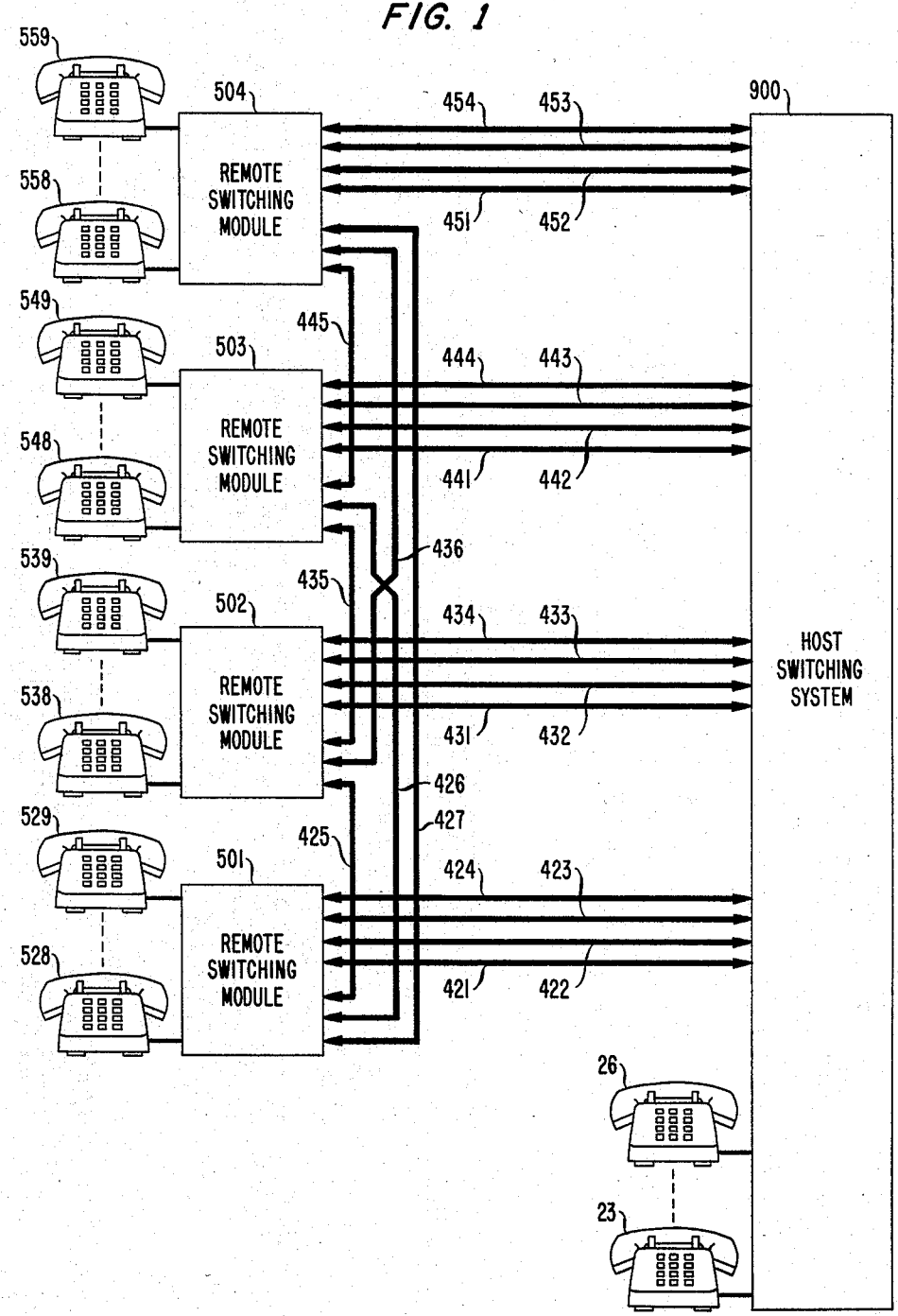
FIG. 1 is a block diagram of a switching system architecture illustrating the principles of the present invention.

FIG. 1 is a block diagram of a switching system architecture illustrating the principles of the present invention. In this architecture, a host switching system 900 is used to interconnect subscriber sets such as sets 23 and 26 for communication. In addition, host system 900 controls the operation of an illustrative cluster of four remote switching modules 501, 502, 503 and 504 serving a plurality of subscriber sets such as sets 528, 529, 538, 539, 548, 549, 558 and 559. In accordance with the present example, each remote switching module is connected to host system 900 via four bidirectional transmission facilities, which can be of substantial length, e.g., 50–100 miles, over which both control information and subscriber-generated information, e.g., voice or data, can be conveyed. Specifically, host system 900 is connected to module 501 by transmission facilities 421 through 424, to module 502 by transmission facilities 431 through 434, to module 503 by transmission facilities 441 through 444 and to module 504 by transmission facilities 451 through 454. Furthermore, each pair of remote switching modules is interconnected by a bidirectional transmission facility similarly capable of conveying both control information and subscriber-generated information. In FIG. 1, module 501 is connected by transmission facilities 425, 426 and 427 to modules 502, 503, and 504, respectively, module 502 is connected by transmission facilities 435 and 436 to modules 503 and 504, respectively, and modules 503 and 504 are interconnected by transmission facility 445. The number of transmission facilities between a given remote switching module and host system 900 or between a given pair of remote switching modules depends on the amount of traffic anticipated therebetween.

When a call is to be set up, for example, from subscriber set 528 connected to remote switching module 501, to subscriber set 559 connected to remote switching module 504, module 501 transmits a control message to host system 900 using an established control channel on one of the transmission facilities 421 through 424. Host system 900 determines based on stored information that at least one channel on transmission facility 427 between modules 501 and 504 is available for the call. Host system 900 then transmits a control message to module 504 via an established control channel on one of the transmission facilities 451 through 454 and, in response, module 504 selects an available channel on transmission facility 427 for the call. Module 504 informs module 501 of the selected channel by transmitting a control message via the established control channel on one of the transmission facilities 451 through 454, which message is routed by host system 900 in the established control channel on one of the transmission facilities 421 through 424 to module 501. Alternatively, module 504 transmits this control message to module 501 via an established control channel on transmission facility 427. Subscriber sets 528 and 559 can now communicate via the selected transmission facility 427 channel without using a host system 900 communication path. Alternatively, the selection of the transmission facility 427 channel to be used for the call is made by module 501.

However, if host system 900 determines that no transmission facility 427 channel is available, the call is not necessarily blocked. As long as a host system 900 communication path is available interconnecting an idle channel on one of the transmission facilities 421 through 424 and an idle channel on one of the transmission facilities 451 through 454, the call can be set up over that alternate path. As before, the control message communication among host system 900 and modules 501 and 504 needed to establish the path is achieved using the established control channels.

The architecture of FIG. 1 also allows the integrated stand-alone operation of modules 501, 502, 503 and 504 to complete a call, for example, from subscriber set 528 to subscriber set 559 without coordination by host system 900. In the stand-alone case, module 501 informs module 504 of the requested call by transmitting a control message using an established control channel on transmission facility 427. In response, module 504 determines that subscriber set 559 is presently idle and selects an available channel on transmission facility 427 for the call. Module 504 then informs module 501 of the selected channel by transmitting a control message using the established transmission facility 427 control channel. The call can then be completed using the selected channel on transmission facility 427. Alternatively, the selection of the transmission facility 427 channel to be used for the call is made by module 501.

DETAILED DESCRIPTION

Figure 2:
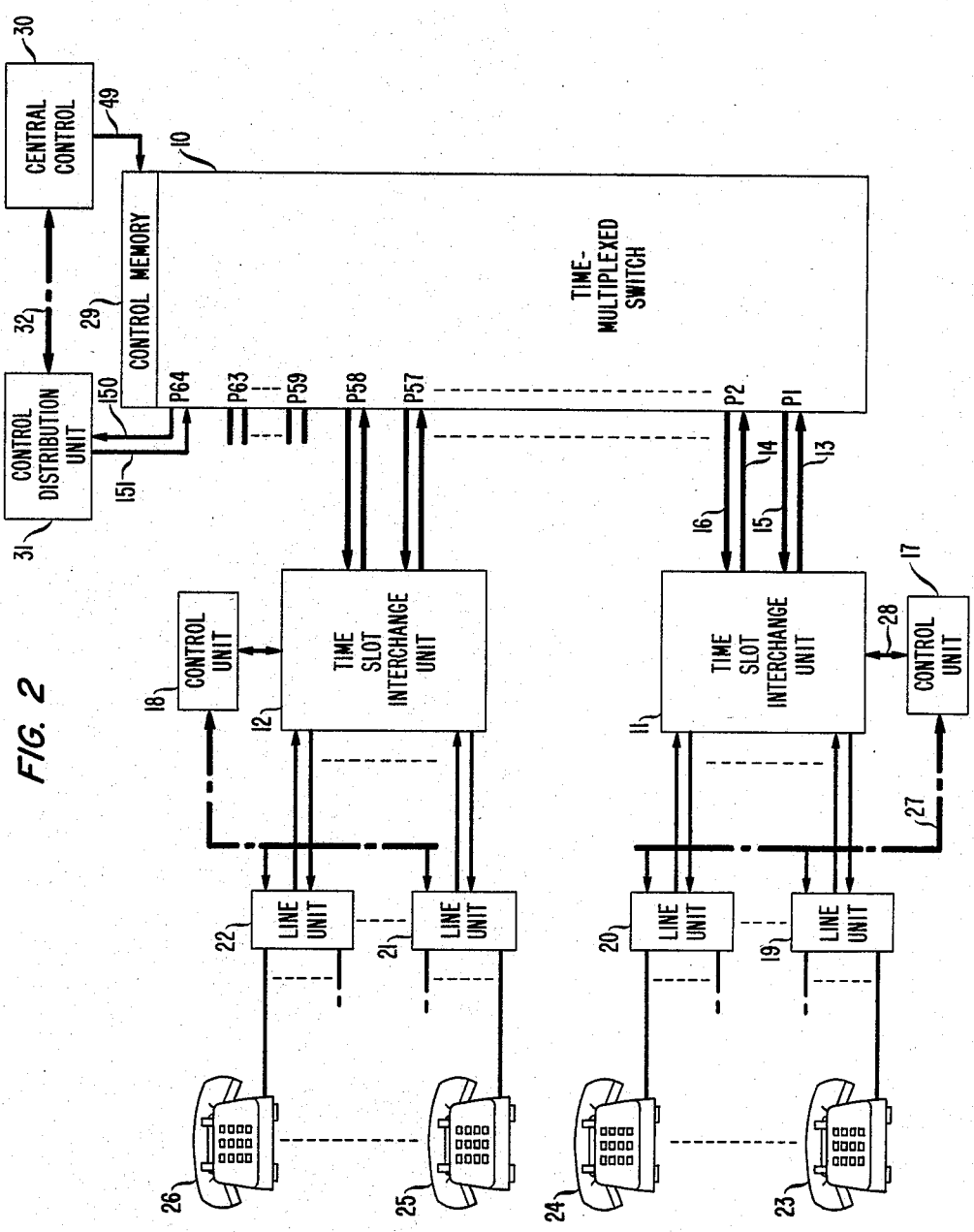
FIG. 2 is a block diagram of a time division switching system capable of being used in the host switching system of the architecture of FIG. 1.
Figure 10:
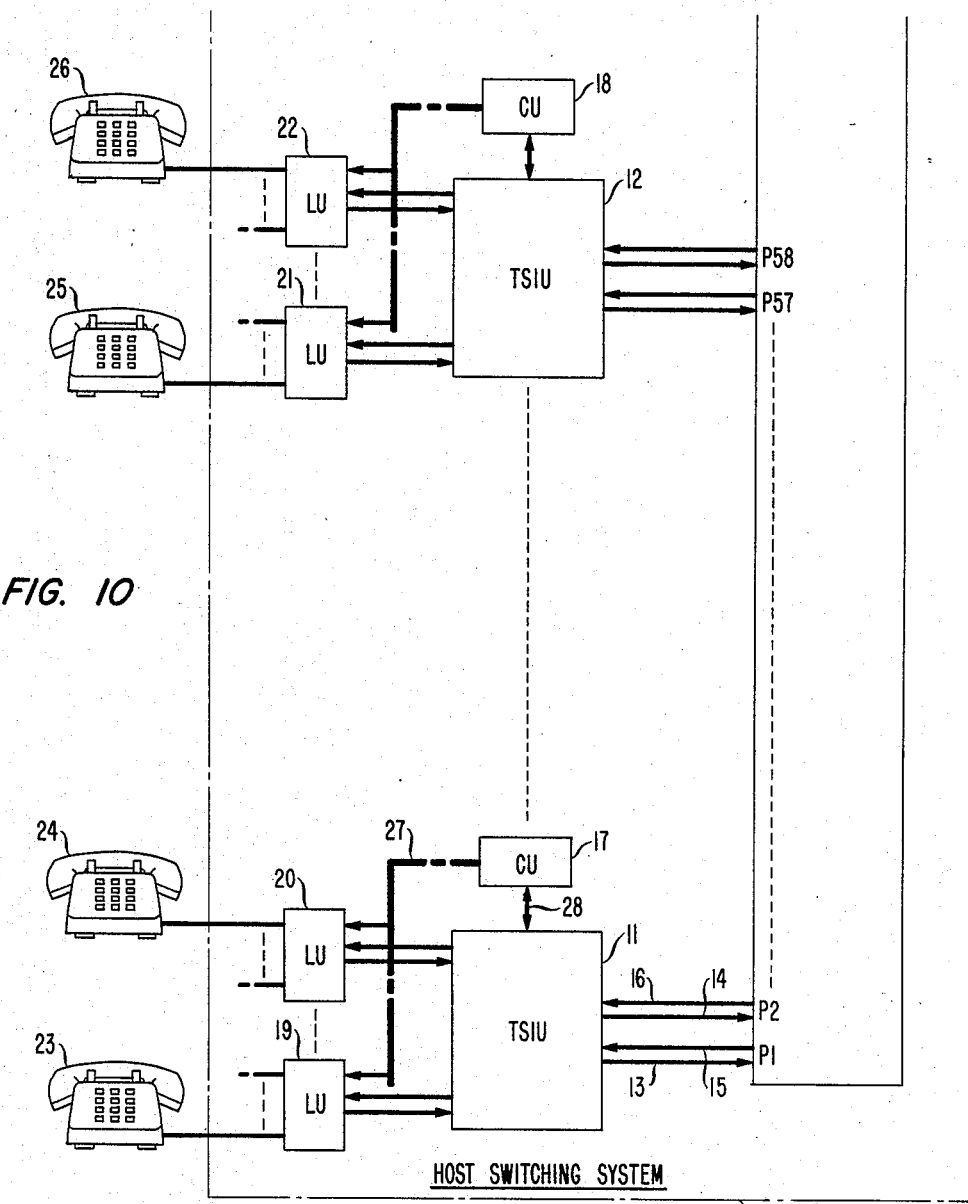
FIG. 10 through 12, when arranged in accordance with FIG. 13, is a block diagram of an exemplary embodiment of the present invention.
Figure 11:
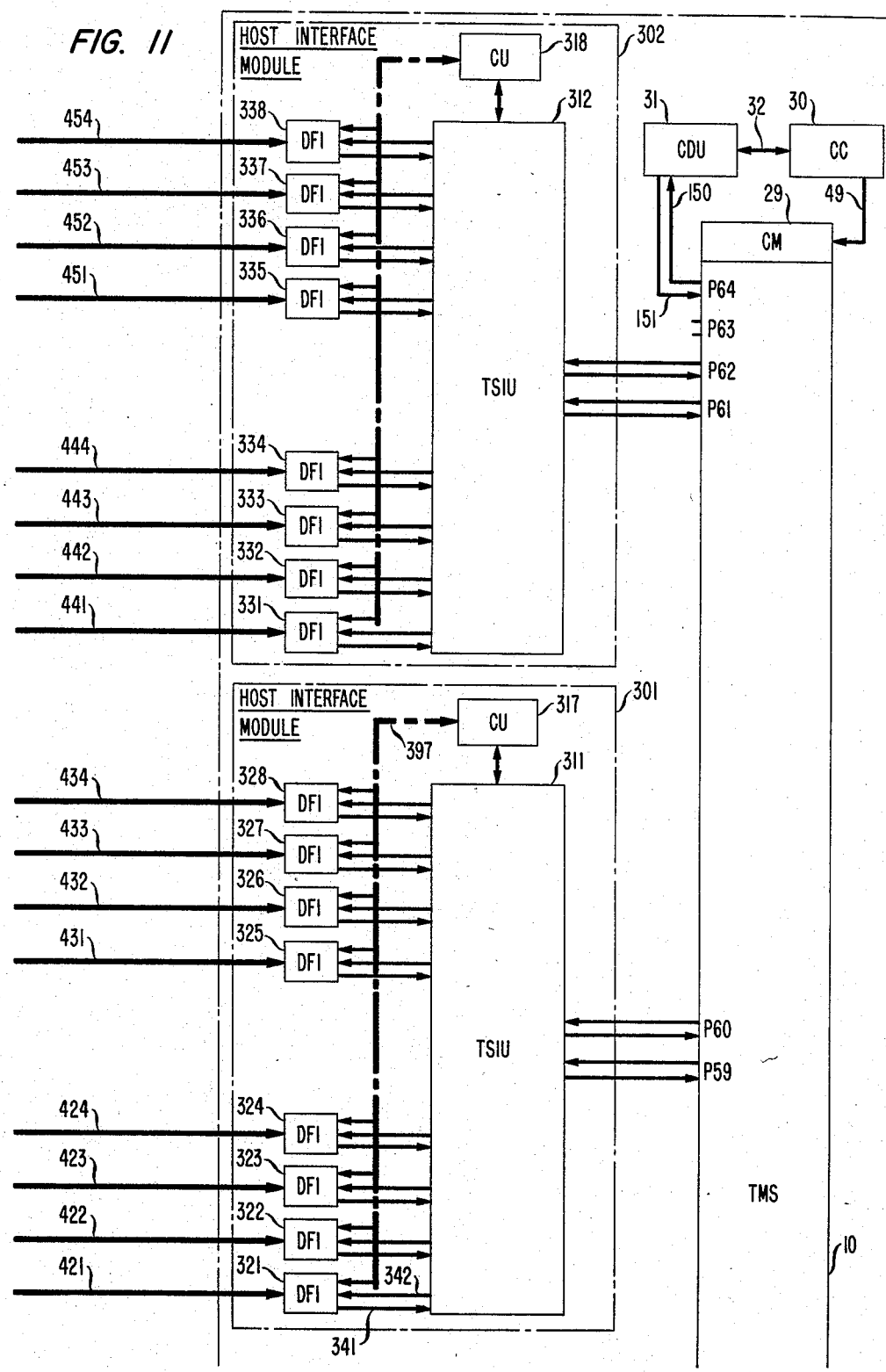
Figure 12:
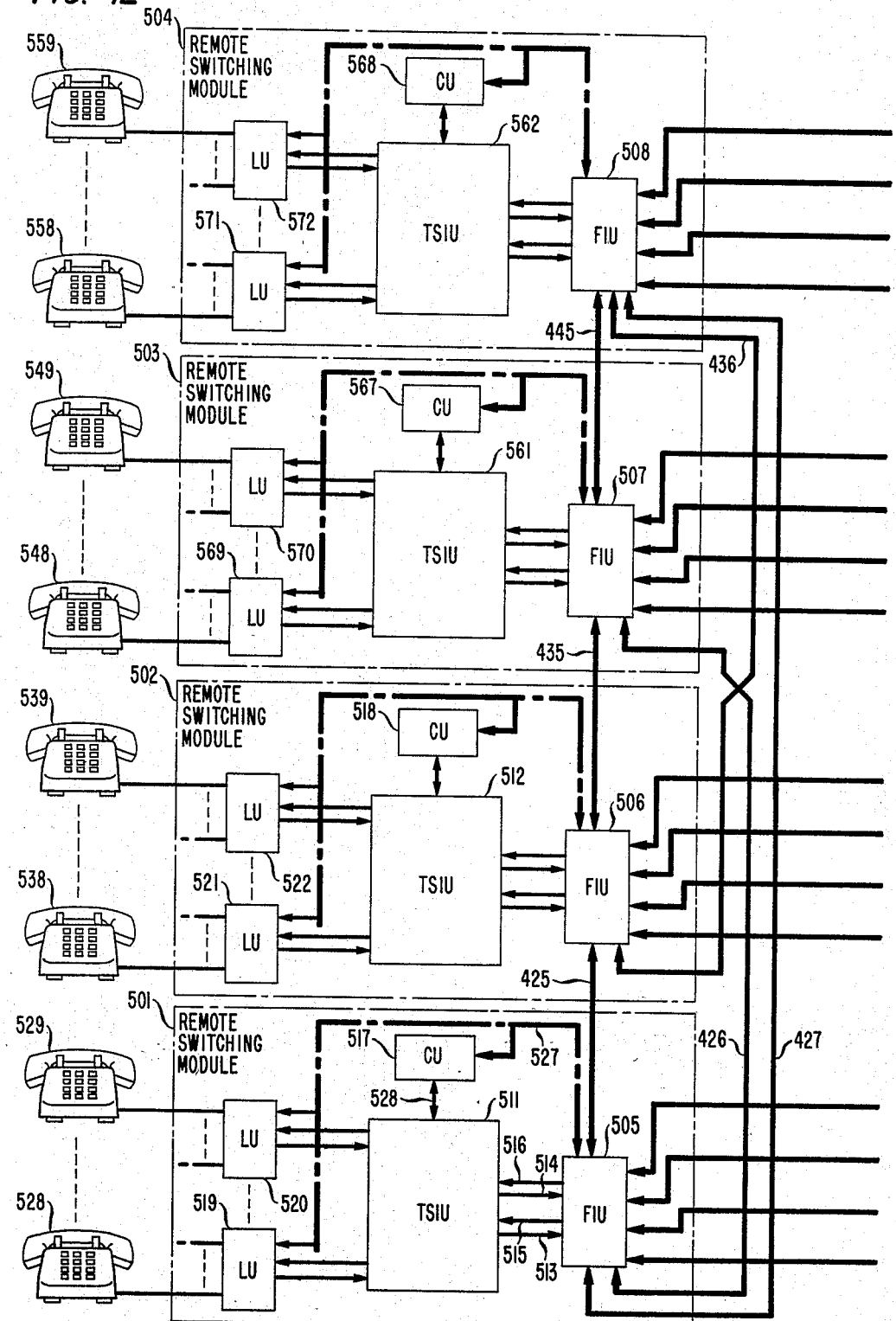

FIG. 2 is a block diagram of a time division switching system, substantial portions of which are disclosed in U.S. Pat. No. 4,322,843 issued to H. J. Beuscher et al., on Mar. 30, 1982, and assigned to the assignee of the present invention. The system of FIG. 2 is used in the host switching system of an exemplary embodiment of the present invention shown in FIG. 10 through 12, when arranged in accordance with FIG. 13. The description which follows is arranged in two parts. First the FIG. 2 system is described. With that description as a foundation, the exemplary embodiment of the invention shown in FIG. 10 through 12 is then described.

FIG. 2 System

The time division switching system of FIG. 2 is used to interconnect subscriber sets such as subscriber sets 23 through 26 and includes a time-multiplexed switch 10 comprising a time-shared space division switch having 64 input ports and 64 output ports. Also included are 29 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input ports and two output ports of time-multiplexed switch 10. In the system of FIG. 2, time-slot interchange unit 11 is connected to two time-multiplexed switch input ports via time-multiplexed lines 13 and 14 and to two output ports, via time-multiplexed lines 15 and 16.

In the description which follows, the input and output ports of time-multiplexed switch 10 are referred to as input/output port pairs. This term is used since the source for data words to an input port of a given input/output port pair is also the destination for data words from the output port of that pair. As shown in FIG. 2, input/output port pair P1 is associated with time-multiplexed lines 13 and 15. Each time-multiplexed line 13 through 16 conveys digital information in 125-microsecond frames each comprising 256 time separated channels. Accordingly, each time-slot interchange unit transmits and receives up to 512 channels of digital information during each 125-microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected to a plurality of line units of which line units 19 through 22 are shown in FIG. 2 via individual time-multiplexed lines. Line units 19 and 20 are connected to time-slot interchange unit 11 and line units 21 and 22 are connected to time-slot interchange unit 12. Each of the line units is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange unit are determined by the control unit of the associated time-slot interchange unit.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Line unit 19 scans the lines connected to each subscriber set to detect requests for service. When such a request is detected, line unit 19 transmits to control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. Line unit 19 also transmits in the assigned channel an indication of the DC state, i.e., open circuit, closed circuit, of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time-multiplexed line between a time-slot interchange unit and the time-multiplexed switch 10 has 256 channels each 125-microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time-multiplexed line between the time-slot interchange units and the time-multiplexed switch 10 under the control of control units 17 and 18.

Time-multiplexed switch 10 operates in recurring frames of time slots where each 125-microsecond frame comprises 256 time slots. During each time slot, time-multiplexed switch 10 is capable of connecting data words received at any of its 64 input ports to any of its 64 output ports in accordance with time-slot control information stored in a control memory 29. The configuration pattern of connections through time-multiplexed switch 10 repeats itself every 256 time slots and each time slot is assigned a numerical designation in sequence from 1 to 256. Accordingly, during a first time slot TS 1 the information in a channel (1) on time-multiplexed line 13 may be switched by time-multiplexed switch 10 to an output port P64 while during the next time slot TS 2 the next channel (2) on time-multiplexed line 13 may be switched to an output port P57. Time-slot control information is written into control memory 29 by central control 30 which generates this control information from control messages obtained from various control units, e.g., 17 and 18.

Central control 30 and control units 17 and 18 exchange control messages utilizing selected channels called control channels of the time-multiplexed lines, e.g., 13 through 16, between the time-slot interchange units and the time-multiplexed switch 10. Each control message comprises a plurality of control words and each control channel can transmit one control word per frame of 256 time separated channels. The same channel of the two time-multiplexed lines associated with a given input/output port pair is predefined to be a control channel. Additionally, a given channel is used as a control channel for only one pair of time-multiplexed lines. For example, if channel 1 is used as a control channel on time-multiplexed line 13 and the associated time-multiplexed line 15, no other time-multiplexed line will use channel 1 as a control channel. During each time slot having the same numerical designation as a control channel, time-multiplexed switch 10 connects the data word occupying that control channel to output port P64 and connects input port P64 to the output port associated with the above-mentioned control channel. The following is an example of the operation of the system of FIG. 2 when channel 1 is the control channel for time-multiplexed lines 13 and 15, and channel 2 is the control channel for time-multiplexed lines 14 and 16. During time slot TS 1 information from control memory 29 defines, among other connections, that the control word in channel 1 of time-multiplexed line 13 is connected to output port P64 and that the control word in channel 1 at input port P64 is connected to time-multiplexed line 15. Similarly, during time slot TS 2, information from control memory 29 defines that the control word in channel 2 of time-multiplexed line 14 is connected to output port P64 and that the control word in channel 2 at input port P64 is connected to time-multiplexed line 16. When operating in this manner, output port P64 receives from time-multiplexed switch 10 all control words in a channel having the same numerical designation in which they were transmitted to the time-multiplexed switch. Further, each control channel is connected to receive control words from input port P64 during the time slot having the same numerical designation as their associated control channel. Control words switched to output port P64 are transmitted to a control distribution unit 31 which temporarily stores them in a location associated with that control channel. The association of control channels with storage locations in control distribution unit 31 identifies the source of the information stored.

Each control message from a time-slot interchange unit comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input port P64 of time-multiplexed switch 10 in a channel having the same numerical designation as the control channel associated with the destination unit.

When operating as above described, time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to input port P64 during the channel having the same numerical designation as the control channel associated with time-slot interchange unit 12. A control message can also be transmitted to central control 30 by defining central control 30 in the destination portion of the control message. When this occurs, control distribution unit 31 transmits the message to central control 30 via a communication link 32 rather than returning it to time-multiplexed switch 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32. The operation of a particular embodiment of control distribution unit 31 is described in detail in the above-cited Beuscher U.S. Pat. No. 4,322,843.

Figure 3:
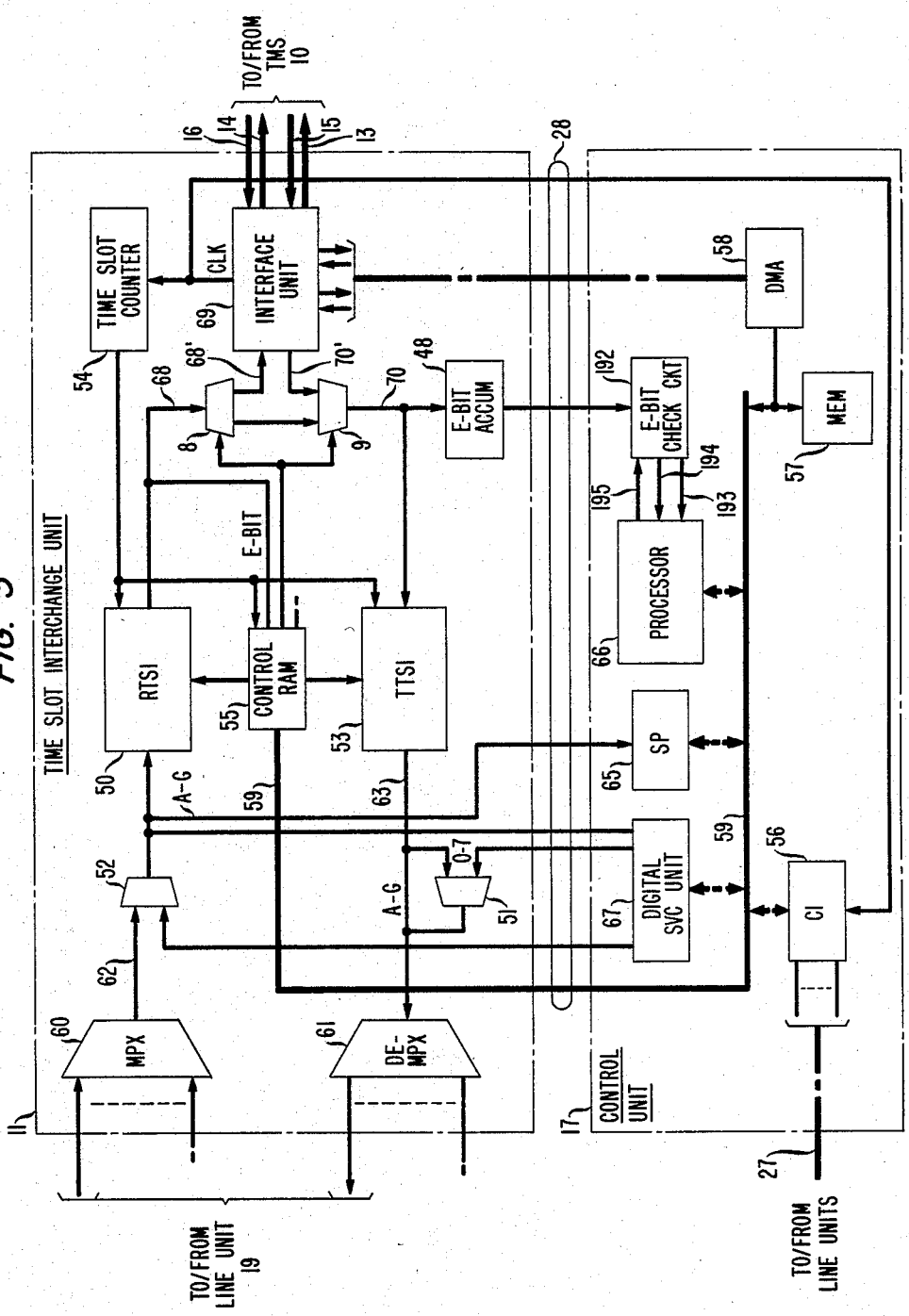
FIG. 3 is a more detailed diagram of a time-slot interchange unit and associated control unit utilized in the system of FIG. 2.

Each of the control units, e.g., 17 and 18, includes a memory 57 (FIG. 3) which stores the program for the control of its associated control unit and data regarding the primary function of the control unit, its associated time-slot interchange unit and its associated subscribers. Memory 57 stores such information as class of service, the subscriber limits for gain or attenuation, toll screening information, and information relating to changes in normal call handling procedures, e.g., terminating party hold or joint hold. Much of the contents of the given memory 57 is not stored in memory locations associated with any other control unit or the central control. It may, however, be stored in a bulk memory (not shown) for maintenance purposes. Some of the information in memory 57, e.g., terminating party or joint hold information, relates primarily to functions performed by other control units. This information is stored in association with the subscriber to which it relates to avoid data replication and to avoid the inefficiencies of centralized storage of such information. The previously described arrangement utilizing control channels transmitted through control distribution unit 31 is utilized to send this call related information to other control units and central control 30.

Figure 4:
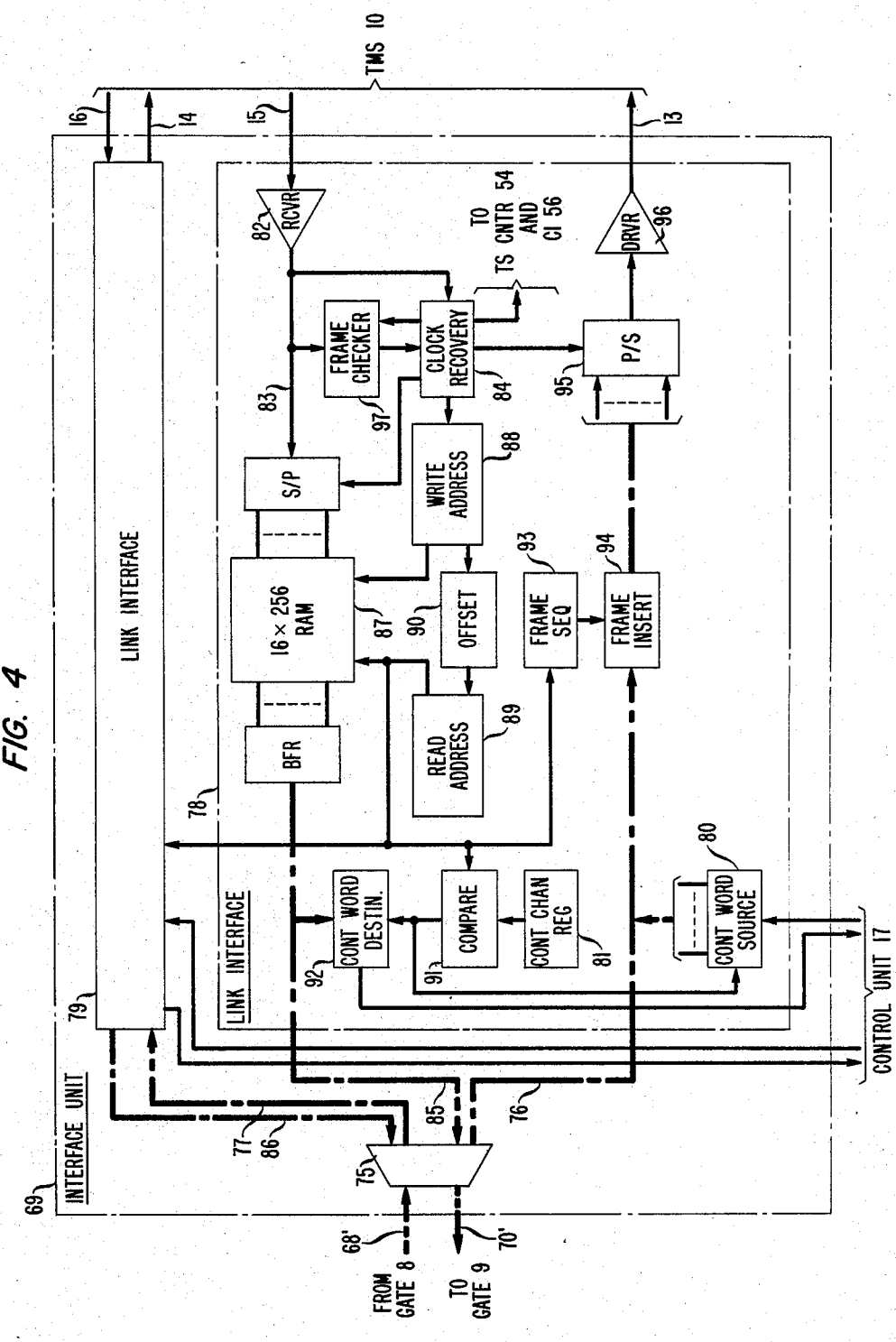
FIG. 4 is a diagram of an interface unit included within each time-slot interchange unit which is utilized for communication with a time-multiplexed switch of the system of FIG. 2.

As previously stated, control unit 17 controls many of the operations performed by each of the line units. The main processing entity of control unit 17 is a processor 66 (FIG. 3) which operates in response to instructions stored in memory 57. Control unit 17 includes a control interface circuit 56 which receives instructions from processor 66 via a bus 59 and in response thereto, communicates with the line units, e.g., 19 and 20, via communication path 27. Control unit 17 also includes a signal processor 65 and a digital service unit 67. Signal processor 65 reduces the real time load requirement of processor 66 by receiving and analyzing the signaling portion (bits A through G, FIG. 6) of each data word received by time-slot interchange unit 11. Digital service unit 67 receives the data portion (FIG. 6) of each data word received by time-slot interchange unit 11 to detect tone signals from subscribers which have been converted into PCM signals. Digital service unit 67 is also used to transmit tones and signals in PCM format via a gate 51 to subscribers and via a gate 52 to time-multiplexed switch 10. The operation of control interface circuit 56, signal processor 65 and digital service unit 67 as well as line unit 19 is described in detail in the above-cited Beuscher U.S. Pat. No. 4,322,843. In the system of FIG. 2, the clock signals used within the line units are transmitted by a clock recovery circuit 84 (FIG. 4) within an interface unit 69 (FIG. 3) via control interface 56 and communication path 27.

Each of the line units transmits recurring frames each comprising 64 digital channels of 16 bits each. This information is transmitted to a multiplex unit 60 (FIG. 3) within time-slot interchange unit 11. Multiplex circuit 60 receives the output signals from eight line units which signals are reformatted and transmitted on an output time-multiplexed line 62 having 512 channels for each 125 microsecond frame. Similarly, a demultiplex circuit 61 receives 512 channels of 16 bits each on a time-multiplexed line 63 which channels are distributed in a predetermined arrangement to eight line units such as line unit 19. Further, multiplex unit 60 converts incoming channels of information from serial to parallel form and demultiplexer 61 converts the information it receives from parallel to serial form. The information transmitted in a given channel on time-multiplexed line 62 is stored in a receive time-slot interchanger 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchanger 50 which is to store that data word. Data words are also read from receive time-slot interchanger 50 at the rate of one data word per time slot. The memory address of the data word to be read from receive time-slot interchanger 50 during a given time slot is obtained by reading control RAM 55. Control RAM 55 is read once per time slot at an address defined by the time-slot designation from time-slot counter 54 and the quantity so read is transmitted to receive time-slot interchanger 50 as the read address for that time slot. Data words read from receive time-slot interchanger 50 are transmitted to time-multiplexed switch 10 via a time-multiplexed line 68, a gate 8, a time-multiplexed line 68′ and an interface unit 69. Data words from time-multiplexed switch 10 are received by time-slot interchange unit 11 by interface unit 69, and are conveyed via a time-multiplexed line 70′, a gate 9 and a time-multiplexed line 70 to transmit time-slot interchanger 53. For calls among the subscribers served by the line units connected to time-slot interchange unit 11, control RAM 55 effects the operation of gates 8 and 9 such that data words transmitted by receive time-slot interchanger 50 on time-multiplexed line 68 are conveyed via gates 8 and 9 and time-multiplexed line 70 to transmit time-slot interchanger 53. Transmit time-slot interchanger 53 stores the incoming data words in a location defined by an address from control RAM 55. Data words are read from transmit time-slot interchanger 53 at the address defined by the time-slot counter 54. Data words so read are transmitted on time-multiplexed line 63 for transmission to the line unit 19. It should be noted that control RAM 55 may be implemented as a number of control memories each associated with a particular circuit, e.g., transmit time-slot interchanger 53. The particular configuration of control memories is not important to the present description and may vary depending on timing and circuitry requirements within the time-slot interchange unit 11. The general principles of time-slot interchange as performed by the receive time-slot interchanger 50, the control RAM 55, the time-slot counter 54 and the transmit time-slot interchanger 53 are well known in the art and are not described in greater detail herein. One arrangement for reading and writing data words in time-slot memories is described in detail in U.S. Pat. No. 4,035,584, J. W. Lurtz.

Figure 8:
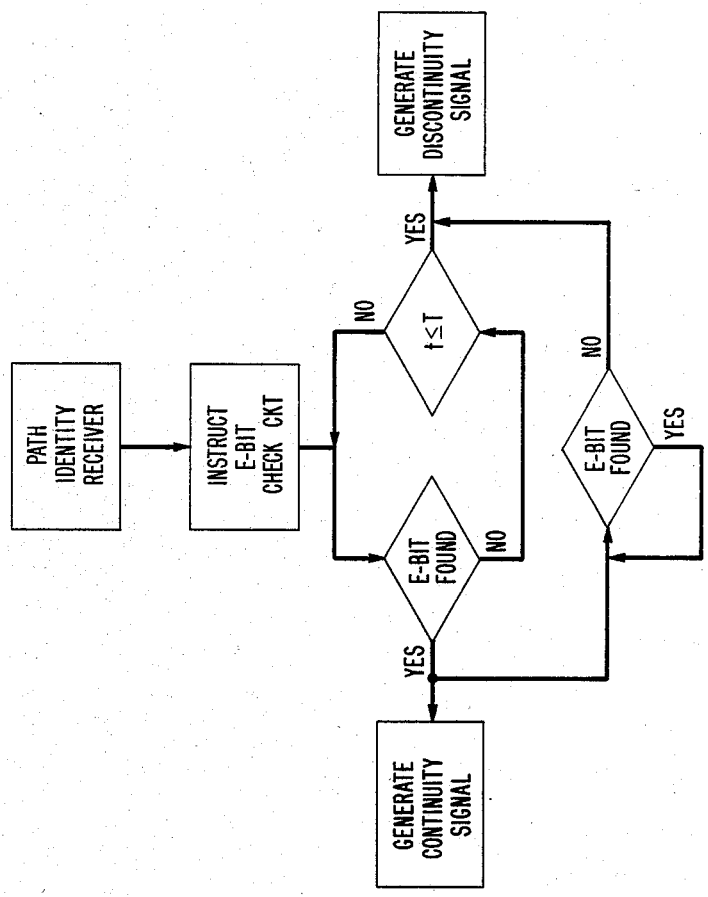
FIG. 8 is a flow diagram of the E-bit control sequence of the system of FIG. 2.

The primary mode of control information exchange in the system of FIG. 2 comprises the transmission of control messages from a source time-slot interchange unit through the time-multiplexed switch 10 and the control distribution unit 31 and back to the destination time-slot interchange unit. A secondary mode of communication is also used whereby control information with regard to a given call is transmitted from the source time-slot interchange unit to the destination time-slot interchange unit via the time-multiplexed switch 10 utilizing the time slot assigned for that call. The E-bit position of the data word in the call time slot is used for the secondary mode communication. However, it can be seen that any or all of the signaling bits could be used in this secondary communication mode. The E-bit serves the dual purposes of communication path continuity check and signal acknowledgment. Control RAM 55 (FIG. 3) includes an E-bit position in each of its 512 storage locations. During the course of a call, processor 66 controls the digit stored in the E-bit position of each storage location of control RAM 55 associated with the call. As control RAM 55 transmits addresses defining data words to be read from receive time-slot interchanger 50, it transmits the stored E-bit on time-multiplexed line 68 in place of the E-bit stored in receive time-slot interchanger 50. This allows the transmission of messages utilizing the E-bit channel between time-slot interchange units. The arrangement in FIG. 3 also includes an E-bit accumulator 48 which receives the E-bit of each data word received on time-multiplexed line 70. These E-bits are transmitted to an E-bit check circuit 192 by E-bit accumulator 48. E-bit check circuit 192 responds to instructions from processor 66 on conductor 195 to transmit output signals relating to the E-bits of selected data words to processor 66. For example, during communication path establishment, processor 66 instructs E-bit check circuit 192 to survey the E-bit position of a particular channel and to notify processor 66 if a logical "1" is received within a predetermined period of time. FIG. 8 is a flow diagram of the function performed by E-bit check circuit 192. When no logical "1" E-bit is found in the specified channel within the predetermined period of time, a discontinuity signal indicating this fact is transmitted to processor 66 via conductor 193. Alternatively, when such a logical "1" is found by E-bit check circuit 192 within the time period, a continuity signal is transmitted to processor 66 via conductor 194. The E-bit check circuit 192 also surveys the E-bit of each active call. When the E-bit of an active call becomes a logical "0" and stays such for a fixed period of time, the above-mentioned discontinuity signal is transmitted to its associated processor 66. Any processor 66 receiving a discontinuity signal transmits a control message to central control 30 indicating this fact.

Figure 9:
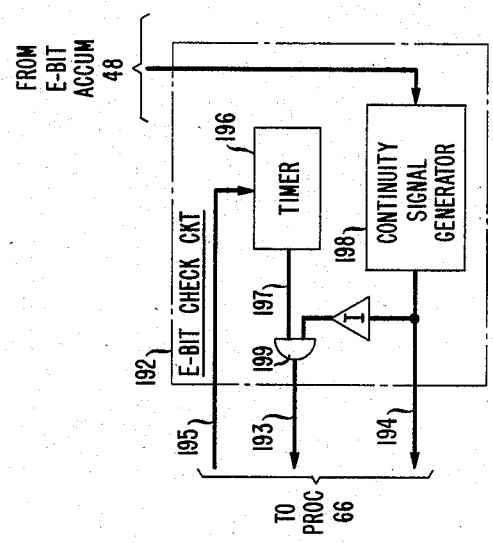
FIG. 9 is a diagram of an E-bit check circuit used in the system of FIG. 2.

FIG. 9 shows the portion of E-bit check circuit 192 associated with one incoming channel, i.e., communication path. A timer 196 begins to count in response to an instruction from processor 66 on conductor 195. When the predetermined period of time has passed since the instruction was received from processor 66 timer 196 transmits a logical "1" on conductor 197 which is connected as one input of AND gate 199, the output of which is connected to conductor 193. Continuity signal generator 198 receives the E-bit position of the associated channel and generates a logical "1" output on conductor 194 in response to a logical "1" E-bit. The logical "1" on conductor 194 is continuously applied until a logical "0" E-bit is found by continuity signal generator 198. The output signals from continuity signal generator 198 are also inverted and applied to an input of AND gate 199. Accordingly, when timer 196 generates its logical "1" output, it will be applied as a discontinuity signal to conductor 193 via AND gate 199 when continuity signal generator 198 is generating a logical "0" output, indicating that no E-bits have been received. Alternatively, whenever continuity signal generator 198 is generating a logical "1" output, the signal on conductor 193 is forced to a logical "0" while the logical "1" continuity signal is transmitted on conductor 194. It should be noted that the functions of the E-bit check circuit may be advantageously performed by processor 66, thus, making the separate E-bit check circuit 192 unnecessary. The use of the E-bit channel in implementing call completion is discussed in greater detail later herein.

The following is a description of the primary mode of communication between the various control entities of the switching system. Processor 66, in response to a complete dialed number, performs translations with regard to that dialed number and formulates a control message for central control 30 (FIG. 2) so that an idle time slot for the call can be established through time-multiplexed switch 10. This control message is stored in memory 57 by processor 66. A DMA unit 58 of a type well known in the art reads the control message at the rate of one control word per frame and transmits that word to a control word source register 80 (FIG. 4) in interface unit 69 for transmission on the time-multiplexed line to time-multiplexed switch 10. Similarly, control messages are received from other control units and central control 30 at a control word destination register 92 (FIG. 4) in interface unit 69 and transmitted by DMA unit 58 to the memory 57 where they are read by processor 66. Interface unit 69, which is shown in detail in FIG. 4, includes a multiplex/demultiplex circuit 75 and two link interfaces 78 and 79. Multiplex/demultiplex circuit 75 is connected to receive data words from the receive time-slot interchange unit 50 via time-multiplexed line 68' and to transmit data words to transmit time-slot interchanger 53 via time-multiplexed line 70'. It will be remembered that both time-multiplexed lines 68' and 70' convey data words at the rate of 512 channels per 125-microsecond frame. Multiplex/demultiplex circuit 75 splits the information received on time-multiplexed line 68' into two time-multiplexed lines 76 and 77 by transmitting the data words in each even-numbered channel on time-multiplexed line 77 and by transmitting each odd-numbered channel on time-multiplexed line 76. Each of the time-multiplexed lines 76 and 77 thus conveys information at the rate of 256 channels per frame. Additionally, multiplex/demultiplex circuit 75 combines the information on two 256-channel time-multiplexed lines 85 and 86 onto the 512-channel time-multiplexed line 70'. This combination occurs by alternatingly transmitting the data words from time-multiplexed lines 85 and 86 such that the data words from time-multiplexed line 85 are transmitted in the odd-numbered channels of time-multiplexed line 70' while data words from time-multiplexed line 86 are transmitted in even-numbered channels. Time-multiplexed lines 76 and 85 are connected to link interface 78 and time-multiplexed lines 77 and 86 are connected to link interface 79. It should be noted that the time-slot interchange unit 11 operates on the basis of 512 time slots (channels) per frame while the link interfaces 78 and 79 and the time-multiplexed switch 10 operate on the basis of 256 time slots (channels) per frame. Further, the channels of data words received from and transmitted to time-slot interchange unit 11 are in complete synchronism. That is, whenever a channel having a given numerical designation is received by link interface 78 from time-slot interchange unit 11, both link interfaces 78 and 79 will be receiving and transmitting channels having the same numerical designation with respect to the time-slot interchange unit 11. In order to maintain synchronism after the split, all odd-numbered channels on time-multiplexed line 68' are delayed by multiplex/demultiplex circuit 75 so that the odd-numbered channel and the immediately following even-numbered channel are transmitted on a respective one of time-multiplexed lines 76 and 77 substantially simultaneously. Similarly, each data word from link interface 79 on time-multiplexed line 86 is delayed by multiplex/demultiplex circuit 75 such that it is transmitted on time-multiplexed line 70' immediately after the data word received by multiplex/demultiplex circuit 75 substantially simultaneously therewith. In the course of the following description, the time slot of a given data word refers to its time slot with respect to link interfaces 78 and 79 and the time-multiplexed switch 10. For example, data words from channels 1 and 2 of time-multiplexed line 68' are both associated with time slot 1 of the link interfaces 78 and 79 and the time-multiplexed switch 10. Each of the link interface units 78 and 79 is uniquely associated with one input/output port pair of time-multiplexed switch 10.

Link interface 78 (FIG. 4) includes the receiver 82 which receives data words transmitted serially from time-multiplexed switch 10 via time-multiplexed line 15 and serially retransmits this information on a conductor 83. A clock recovery circuit 84 receives the incoming bit stream by connection to conductor 83 and recovers a 32.768-megahertz clock signal therefrom. This clock signal is used to provide timing for link interface circuit 78. For reasons to be described in greater detail later herein, the information received on time-multiplexed line 15 is not necessarily in channel synchronization with that transmitted on time-multiplexed line 13. In order to achieve channel synchronism between the data words on time-multiplexed lines 76 and 85, the incoming data words on conductor 83 are buffered in a random access memory circuit 87. The data words on conductor 83 are written into random access memory 87, at a location defined by a write address generator 88. Write address generator 88 receives a 2.048-megahertz clock signal from the clock recovery circuit 84 and in response thereto generates a recurring sequence of 256 write addresses in synchronism with the incoming data words on conductor 83. Data words are read from random access memory 87 for transmission to time-slot interchange unit 11 at locations defined by a read address generator 89 which generates a recurring sequence of 256 read addresses. The read addresses are derived from information received from an offset circuit 90. Offset circuit 90 receives the write addresses generated by the write address generator 88, and effectively subtracts a predetermined number therefrom. The result of this subtraction is then transmitted to read address generator 89. In this manner, read address generator 89 generates a sequence of read addresses which is approximately one-fourth of a frame (64 time slots) behind the addresses generated by the write address generator 88.

Link interfaces 78 and 79 of interface unit 69 operate in a master/slave mode to maintain channel synchronism. In the present embodiment, link interface 78 is the master and continues to operate in the manner described above. The read address generator of link interface 79 is, however, driven by read addresses from the read address generator 89 of link interface 78. It should be noted that, due to possible differences in the length of time-multiplexed lines 15 and 16, more or less than one-quarter frame of information may separate the write addresses and read addresses utilized in link interface 79. This occurs since the data words transmitted on time-multiplexed lines 85 and 86 are in channel synchronism while no such synchronism is required on time-multiplexed lines 15 and 16.

The same channel is used in a given link interface to both transmit and receive control messages. The particular channel used by a given link interface, e.g., link interface 78, to convey control messages is preset and stored in a control channel register 81. Each read address generated by read address generator 89 is transmitted to a comparator 91 which compares that read address to the preset control channel designation stored in control channel register 81. When comparator 91 determines that the instant read address is identical to the control channel designation, it generates a gating signal which is transmitted to control word source register 80 and to a control word destination register 92. Control word destination register 92, in response to the gating signal from comparator 91, stores the information on time-multiplexed line 85. During that particular channel, the information on time-multiplexed line 85 comprises the contents of the control channel to be utilized by the control unit 17. By the operation of DMA unit 58, the contents of control word register 92 are transmitted to memory 57 before the next control channel. Similarly, control word source register 80 responds to the gating signal from comparator 91 by gating its contents out to time-multiplexed line 76, thus transmitting the control word. Control words are transmitted and received by link interface 79 in a substantially similar manner, however, the particular control channel designation associated with link interface 79 is different than that associated with link interface 78.

The read addresses generated by read address generator 89 are also transmitted to a frame sequence generator 93. Frame sequence generator 93 responds thereto by generating a unique sequence of framing bits at the rate of one bit per channel. During each channel, the bit generated by the frame sequence generator 93 is transmitted to a frame insert circuit 94 which places the framing bit into the G-bit location of the data word from time-slot interchange unit 11. The data word including this framing bit is then transmitted via a parallel-serial register 95 and a driver circuit 96 to time-multiplexed line 13 which is connected to a unique input port of time-multiplexed switch 10. Each data word received by link interface 78 includes a framing bit which is generated and transmitted by the time-multiplexed switch 10. A frame checker 97 reads each framing bit of each data word from time-multiplexed switch 10 and determines if the communication between time-multiplexed switch 10 and itself is still in synchronism. If synchronism exists, no corrections are made; however, if synchronism is found not to exist, reframing is accomplished by communication with the clock recovery circuit 84 in a manner well known in the art.

Figure 5:
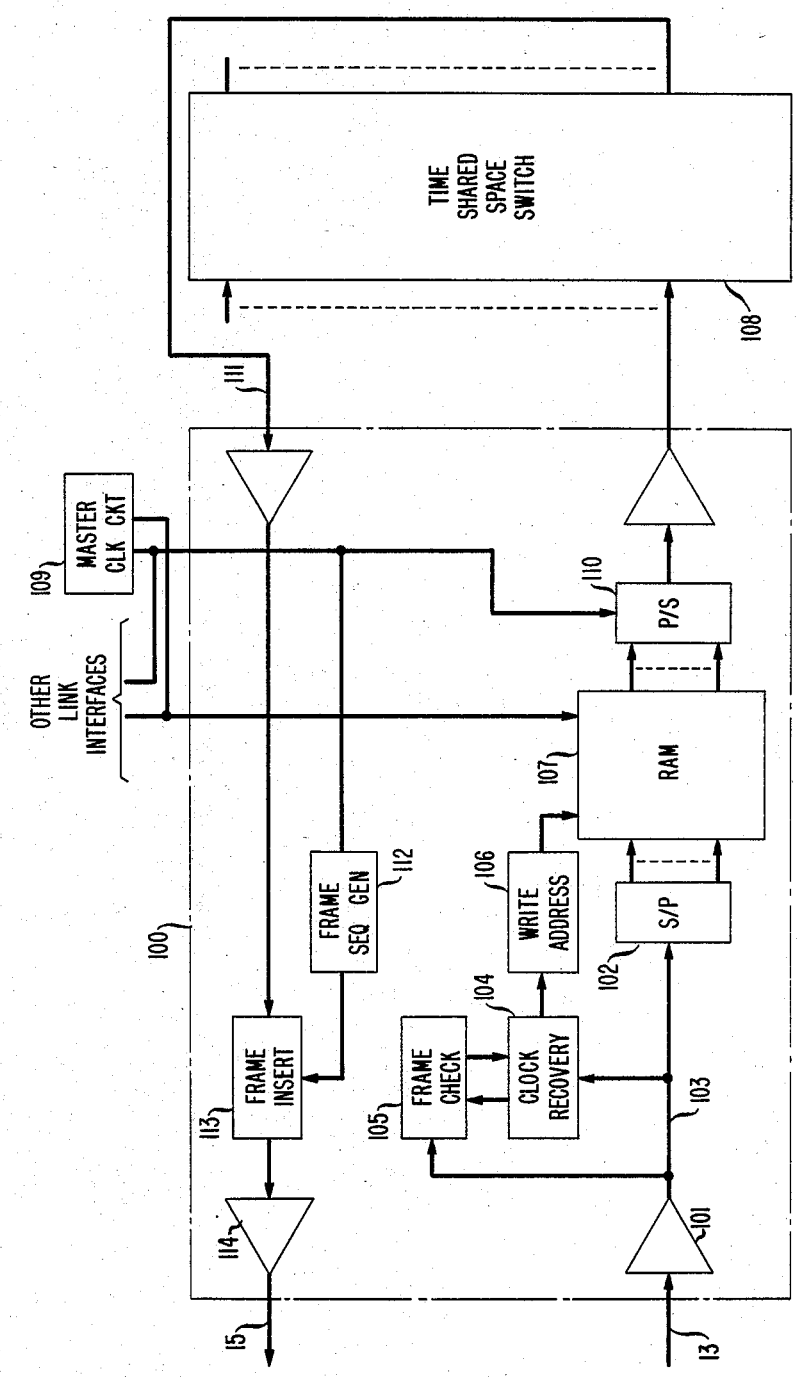
FIG. 5 is a diagram of an interface unit of the time-multiplexed switch which is utilized for communication with a time-slot interchange unit of the system of FIG. 2.

The input and output ports of time-multiplexed switch 10 can be considered in pairs for both ports are connected to the same link interface. Further, each pair of input and output ports of the time-multiplexed switch 10 is connected to a time-multiplexed switch link interface of a type similar to link interfaces 78 and 79. Link interface 78 is connected to a time-multiplexed switch link interface 100 (FIG. 5) including a receiver 101 which receives data words from time-multiplexed line 13 and transmits those data words to a serial-parallel register 102 via a time-multiplexed line 103. The bit stream from time-multiplexed line 103 is also applied to a clock recovery circuit 104 and a frame check circuit 105 which derive clock signals therefrom and determine if frame synchronism is present, respectively. Time-multiplexed switch link interface 100 further includes a write address generator 106 which generates a sequence of write addresses in response to signals from clock recovery circuit 104. Each data word transmitted to serial-parallel register 102 is then written into a random access memory 107 at the address generated by write address generator 106.

Time-multiplexed switch 10 also includes a time-shared space division switch 108 which operates in frames of 256 time slots of approximately 488 nanoseconds each to complete paths among its input and output ports. Control information defining the switching path between the input and output ports to be connected during each time slot is stored in a control memory 29 (FIG. 2) which is read each time slot to establish those connections. It will be remembered that each time slot has a numerical designation and that during a given time slot the data word channel having the same numerical designation is to be switched. Accordingly, all data words in a channel having a given numerical designation must be transmitted to the time-shared space division switch 108 during their associated time slot to avoid inaccurate switching. To this end, time-multiplexed switch 10 includes a master clock circuit 109 for generating a recurring sequence of 256 read addresses which are transmitted to each random access memory of each time-multiplexed switch link interface substantially simultaneously. Accordingly, random access memory 107 and the equivalent random access memories included in all other time-multiplexed switch link interfaces read a data word associated with the same time slot at substantially the same time. The data words read from random access memory 107 are transmitted to a parallel-serial shift register 110 from which they are transmitted to time-shared space division switch 108.

All data words to be transmitted on time-multiplexed line 15 to link interface 78 are received from the time-shared space division switch 108 on a conductor 111 within one time slot of their transmission into time-shared space division switch 108. Time-multiplexed switch link interface 100 includes a frame sequence generator 112 which generates a sequence of framing bits at the rate of one bit per time slot. The framing bits are transmitted to a frame insert circuit 113 which places the frame bit in bit position G of each data word on conductor 111. Each data word on conductor 111 is then transmitted via driver circuit 114 to link interface 78 via time-multiplexed line 15.

The following is an example of call setup and removal in the system of FIG. 2. In the example, a subscriber at subscriber set 23 wishes to call subscriber 26. Line unit 19 detects the originating off-hook at subscriber set 23 and transmits a message to control unit 17 via communication path 27. Control unit 17, in response to this message from line unit 19 transmits an instruction to line unit 19 defining which communication channel between line unit 19 and time-slot interchange unit 11 is to be used for data word communication. Further, control unit 17 begins to transmit dial tone in the channel associated with the newly off-hook subscriber between time-slot interchange unit 11 and line unit 19. Control unit 17 continues to survey the DC state of subscriber set 23. Control unit 17 further detects the dialing of digits at subscriber set 23 and terminates dial tone in response to the first such digit. Based on the entire dialed number and the calling party's identity, control unit 17 formulates a control message for central control 30. This control message comprises a destination portion identifying central control 30 and further includes the calling party identity, the called party identity, and certain calling party related information, e.g., class of service.

FIG. 7 is a functional diagram of the communication among the processors for the establishment of a call between subscribers. In FIG. 7 originating unit 190 represents originating subscriber set 23, line unit 19, time-slot interchange unit 11, and control unit 17. Similarly, terminating unit 191 represents terminating subscriber 26, line unit 22, time-slot interchange unit 12, and control unit 18. Each communication in the call completion sequence is represented in FIG. 7 by a line, terminating with an arrowhead to indicate its direction, having an associated letter (a) through (g). In the course of the following discussion, the letters (a) through (g) are used to identify the particular communication being discussed. The control message (a) formulated by control unit 17 of the originating unit 190 is transmitted, as previously described, one control word per frame in the control channel of time-multiplexed line 13. The time-multiplexed line associated with an odd-numbered input/output port is the primary time-multiplexed line used to convey control messages. The time-multiplexed line associated with an even-numbered input/output port pair is utilized to convey longer messages such as program and/or data update messages. Accordingly, the control channel of time-multiplexed line 13 is used to convey the control messages in the present example. The control words in this control channel are switched by time-multiplexed switch 10 to the control distribution unit 31 during the time slot associated with that control channel. As previously described, control distribution unit 31 interprets the destination portion of the message received and transmits the message to central control 30.

Central control 30 computes the identity of the time-slot interchange unit associated with the called party identity and assigns an idle time slot for communication between called and calling parties. In the present example, it is assumed that time slot TS 16 is selected for this communication. Central control 30 then transmits a control message (b) to time-slot interchange unit 12 of terminating unit 191 which is connected to subscriber set 26 via the control distribution unit 31 and time-multiplexed switch 10. This control message (b) comprises the called subscriber identity, the identity of time-slot interchange unit 11 which is connected to the calling party and the time slot to be used for communication through time-multiplexed switch 10. At substantially the same time that central control 30 transmits the control message (b) to time-slot interchange unit 12, it transmits instructions (c) to control memory 29 via communication path 49 which instructions define the switching paths to be used during time slot TS 16 to connect time-slot interchange unit 11 and time-slot interchange unit 12. Control unit 18 of terminating unit 191 in response to the control message (b) from central control 30 assigns a channel between line unit 22 and time-slot interchange unit 12 for the communication with subscriber set 26 and begins transmission of the logical "1" E-bit (d) in the channel associated with subscriber set 26 to the time-multiplexed switch 10. Recall that a control unit controls the transmission of logical "1" E-bits in a given channel by accessing the storage location of RAM 55 associated with that channel and setting its E-bit position to a logical "1". Further, control unit 18 formulates a control message defining the identities of time-slot interchange unit 12 of the terminating unit 191, the time slot (TS 16) which is to be used for the communication, and any information about subscriber set 26 which is necessary for control unit 17 to complete the call. This control message (e) is transmitted to time-slot interchange unit 11 of originating unit 190 via the control channel to time-multiplexed switch 10, the control distribution unit 31 and back through time-multiplexed switch 10 in the control channel associated with time-slot interchange unit 11. In addition to the above, processor 66 of control unit 18 instructs E-bit check circuit 192 to survey the state of the E-bit in time slot TS 16 for a predetermined period of time, e.g., 128 frames.

Control unit 17, in response to the message from control unit 18 begins to transmit in the channel associated with subscriber set 23 a logical "1" E-bit (f) to time-multiplexed switch 10. Further, control unit 17 of the originating unit 190 checks the E-bit of the incoming channel 16 from time-slot interchange unit 12 for the presence of a logical "1". When such a logical "1" E-bit is received, a continuity signal is transmitted from E-bit check circuit 192 to processor 66 of control unit 17 indicating that communication path continuity from time-slot interchange unit 12 to time-slot interchange unit 11 is known. When communication path continuity exists from time-slot interchange unit 11 to time-slot interchange unit 12, E-bit check circuit 192 of control unit 18 will detect a logical "1" E-bit in channel 16 during the predetermined period of time. E-bit check circuit 192 of control unit 18 transmits a continuity signal to its associated processor 66 in response to the logical "1" E-bit. In response to the continuity signal from E-bit check circuit 192 of control unit 18, line unit 22 is notified to transmit ring current to subscriber set 26 and audible ring tones are returned during time slot TS 16 to subscriber set 23. When subscriber set 26 is taken off-hook, line unit 22 notifies control unit 18 which terminates the transmission of audible ring tones to subscriber set 23 and terminates the application of ring current to subscriber set 26. Control unit 18 then transmits a control message (g) over the control channel from time-slot interchange unit 12 to time-slot interchange unit 11 indicating that an answer has occurred. The parties can now communicate.

Call termination normally is controlled by the control unit associated with the calling party, which, in the present example, is control unit 17. When subscriber set 23 goes on-hook, the E-bit in the channel between subscriber sets 23 and 26 is changed to a logical "0". Control unit 18 in response to the logical "0" E-bit transmits a control message to central control 30 defining that its part of the call is completed. Further, a similar message is transmitted from control unit 17 when the on-hook is detected. In response to these two messages, central control 30 controls the control memory 29 to drop the path connecting the channels between subscriber sets 23 and 26. Further, the control units 17 and 18 make the path from their associated subscriber sets to the time-multiplexed switch 10 idle so that these paths can be used for further communications. When subscriber set 26 is the first to go on-hook, control unit 18 transmits the control message to control unit 17 via the control channel informing control unit 17 that the on-hook has occurred. Control unit 17, in response to such a message, waits for a predetermined period of time, similar to hit timing, then initiates the call termination procedure as described immediately above.

The terminating party can have certain characteristics which change the normal call completion/termination routine. For example, subscriber 26 (the terminating subscriber of the previous example) might be subject to call tracing. In this situation it is desirable that any call to subscriber 26 be held in the completed state until subscriber 26 goes on-hook. In accordance with this example, a call is established in much the same manner as described in the previous example. The first control message from time-slot interchange unit 12 to time-slot interchange unit 11, however, will include a portion indicating that call tracing is operative on the soon-to-be-completed call. Control unit 17 in response to this control message, modifies the call termination sequence so that the completed paths are not removed until a message is received from control unit 18 indicating that subscriber 26 has gone on-hook.

EXEMPLARY EMBODIMENT OF THE INVENTION

Figure 13:
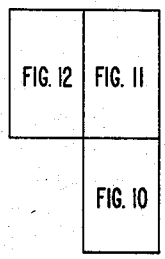

An exemplary embodiment of the present invention, shown in FIG. 10 through 12 arranged in accordance with FIG. 13, includes a host switching system 900 (FIG. 10 and 11) and a cluster of remote switching modules 501, 502, 503 and 504 (FIG. 12). Host switching system 900 comprises the time division switching system of FIG. 2, as described above, and two host interface modules 301 and 302, module 301 being connected to input/output port pairs P59 and P60 of time-multiplexed switch 10 and module 302 being connected to input/output port pairs P61 and P62. In this exemplary embodiment, each remote switching module is connected to a host interface module via four bidirectional, digital transmission facilities such as the T1 carrier system disclosed in the J. H. Green et. al, U. S. Pat. No. 4,059,731. Specifically, host interface module 301 is connected to module 501 by transmission facilities 421 through 424 and to module 502 by transmission facilities 431 through 434 and host interface module 302 is connected to module 503 by transmission facilities 441 through 444 and to module 504 by transmission facilities 451 through 454. Furthermore, each pair of remote switching modules is interconnected by a digital, bidirectional transmission facility such as the above-mentioned T1 carrier system. Module 501 is connected by transmission facilities 425, 426 and 427 to modules 502, 503 and 504, respectively, module 502 is connected by transmission facilities 435 and 436 to modules 503 and 504, respectively, and modules 503 and 504 are interconnected by transmission facility 445.

Host Interface Module 301

Figure 15:
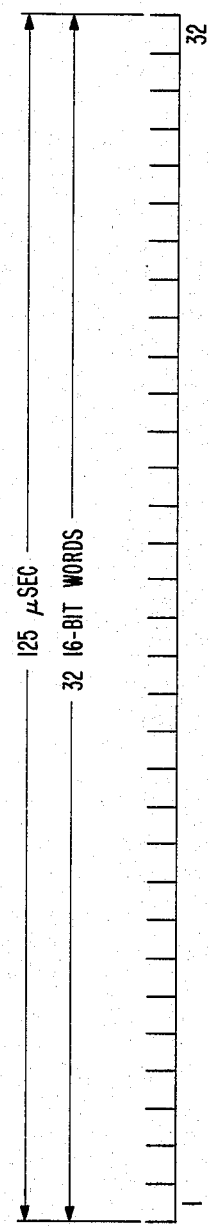
FIGS. 15 and 16 are diagrams of frame formats used in the system of FIGS. 10 through 12.
Figure 16:
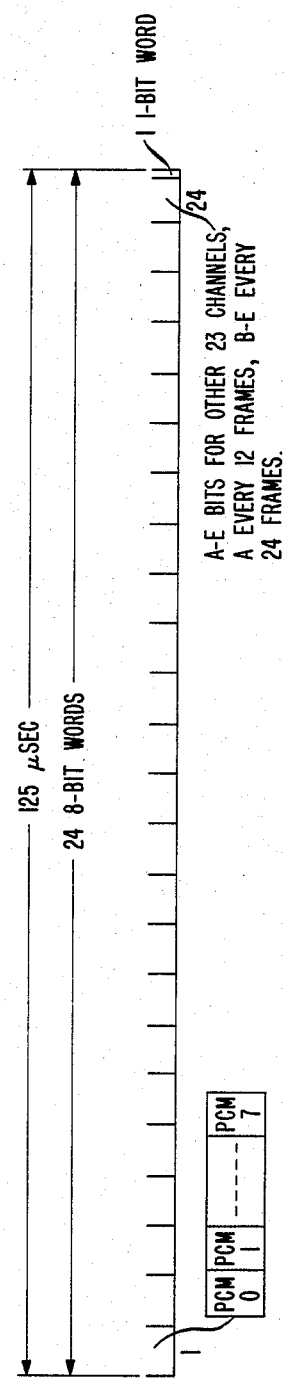

Host interface module 301 includes a time-slot interchange unit 311 and an associated control unit 317 which are substantially identical to time-slot interchange unit 11 and control unit 17, respectively. Time-slot interchange unit 311 transmits and receives 512 channels of information via two 256-channel time-multiplexed lines connected to input/output port pairs P59 and P60 of time-multiplexed switch 10. Control channel 59 at input/output port pair P59 and control channel 60 at input/output port pair P60 are used to convey control messages between control unit 317 and control distribution unit 31. In the present embodiment, time-slot interchange unit 311 transmits 23 of its available 512 channels via each of eight 32-channel time-multiplexed lines to eight digital facility interfaces 321 through 328. (Nine channels on each of the 32-channel time-multiplexed lines to digital facility interfaces 321 through 328 are unused. Accordingly, only 184 of the 512 time-slot interchange unit 311 channels are used. Host interface module 301 could further include additional line units such as line unit 19 to utilize the other time-slot interchange unit 311 channels.) Each digital facility interface operates under the control of control unit 317 to reformat the information in a given 32-channel frame from time-slot interchange unit 311 into a corresponding 24-channel frame for transmission on one of the digital transmission facilities, e.g., 421. For example, digital facility interface 321 receives each 32-channel, 125-microsecond frame on time-multiplexed line 342 in the format shown in FIG. 15. In this data format each frame comprises 32 sixteen-bit words, each word being in the format shown in FIG. 6. Interface 321 extracts the information in 23 predetermined channels of the 32 channels on line 342 and transmits that information in the format shown in FIG. 16. That data format comprises 24 eight-bit words and a single one-bit word. Interface 321 places the eight PCM bits of each of the 23 predetermined channels in the first 23 channels on transmission facility 421. Channel 24 on transmission facility 421 is used to transmit the signaling bits A through E for the 23 predetermined channels. The A-bit of a given channel is transmitted once every twelve frames and bits B through E of that channel are transmitted once every 24 frames. The single one-bit word in the format of FIG. 16 is used both to convey framing information and to convey control information to remote switching module 501. The use of this one-bit word to convey such control information is described in U.S. Pat. No. 4,245,340, J. E. Landry, and the communication channel or control channel achieved thereby is referred to herein as a derived data link. Digital facility interface 321 also receives 24-channel frames in the format of FIG. 16 from transmission facility 421 and converts the received information into the 32-channel frame format of FIG. 15 for transmission to time-slot interchange unit 311 on time-multiplexed line 341. Note that nine of the 32-channels on lines 341 and 342 are unused.

Digital Facility Interface 321

Figure 19:
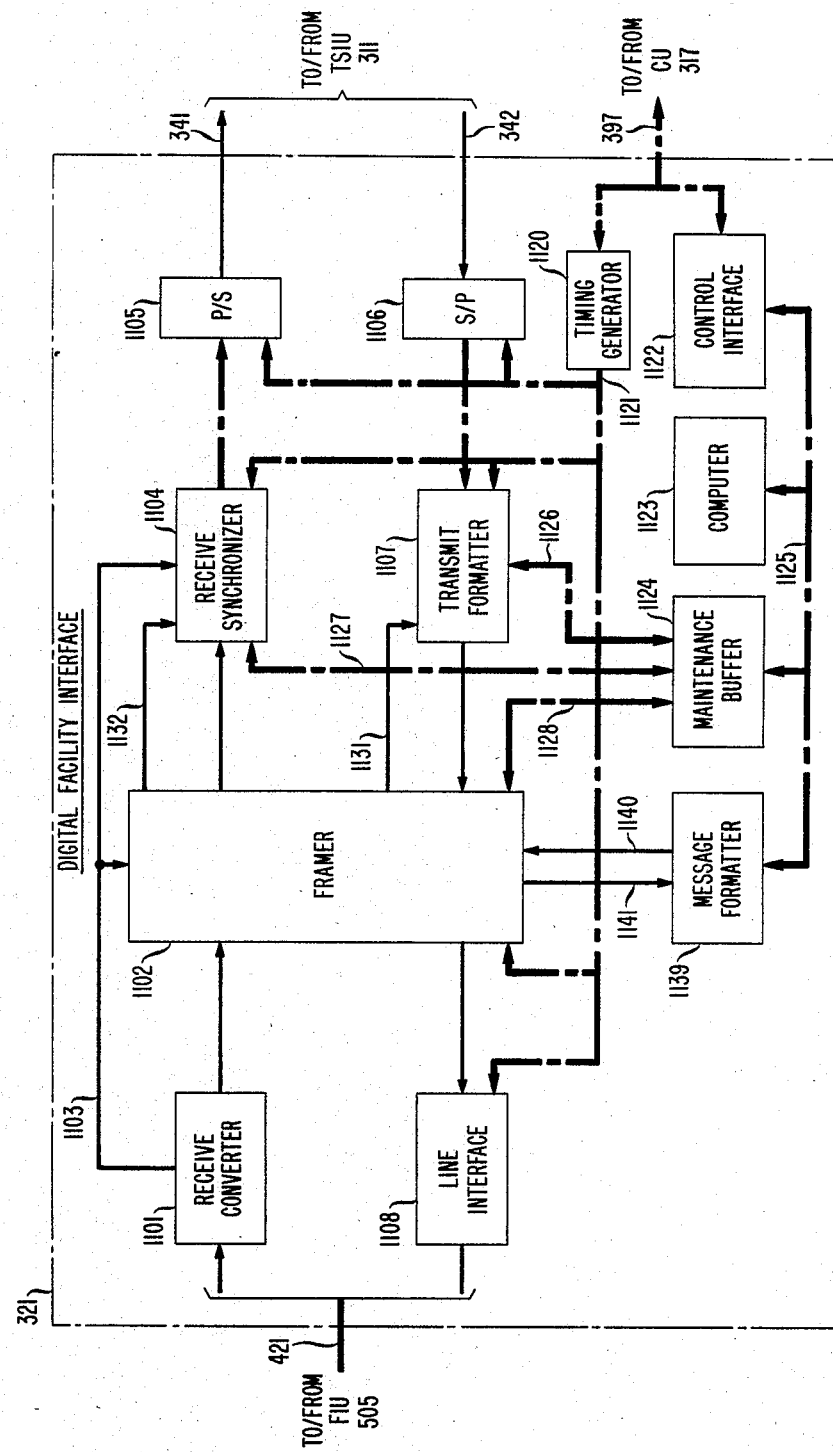
FIG. 19 is a more detailed diagram of a digital facility interface included in the system of FIGS. 10 through 12.

FIG. 19 is a more detailed diagram of digital facility interface 321. Control unit 317 (FIG. 11) transmits timing signals via its control interface 56 and a communication path 397 to a timing generator 1120 included in digital facility interface 321. These timing signals comprise a 4.096-megahertz clock signal and an 8-kilohertz frame sync pulse derived from the data stream transmitted by time-multiplexed switch 10 output port P59. In response, timing generator 1120 generates and transmits various timing signals, referred to herein as system timing signals, via a path 1121 to a serial-parallel register 1106, a transmit formatter 1107, a framer 1102, a line interface 1108, a receive synchronizer 1104 and a parallel-serial register 1105 within digital facility interface 321. Data words are received serially by serial-parallel register 1106 from time-slot interchange unit 311 on 32-channel time-multiplexed line 342 at a bit rate of 4.096-megahertz and are transmitted in 16-bit parallel format to transmit formatter 1107. Transmit formatter 1107 extracts the information in 23 of the 32 channels from line 342 and serially transmits that information in the format of FIG. 16 to framer 1102. Framer 1102 receives system timing signals from timing generator 1120 and derives therefrom a superframe sync pulse defining a superframe of 24 frames, the superframe having a duration of 3 milliseconds. Framer 1102 transmits this superframe sync pulse to transmit formatter 1107 on a conductor 1131. Transmit formatter 1107 transmits the PCM bits of the 23 extracted line 342 channels in the first 23 channels of each frame transmitted to framer 1102. Transmit formatter 1107 transmits the signaling bits A through E of the 23 extracted channels using channel 24. The A-bit of a given channel is transmitted once every twelve frames, i.e., twice per superframe, and bits B through E of that channel are transmitted once per superframe. The selection of which 23 line 342 channels are to be extracted is predetermined at system initialization by the processor 66 of control unit 317, which transmits channel-defining signals via path 397 and a control interface 1122 to a computer 1123. A bus 1125 interconnects control interface 1122, computer 1123 and a maintenance buffer 1124. Computer 1123 informs transmit formatter 1107 of the 23 selected line 342 channels via maintenance buffer 1124 and a path 1126. Further, processor 66 of control unit 317 can subsequently change the selected line 342 channels. Transmit formatter 1107 receives a 1.544-megahertz system timing signal from timing generator 1120 and uses that timing signal to transmit data in the FIG. 16 format to framer 1102 at a bit rate of 1.544 megahertz. Framer 1102 inserts the appropriate framing bits in the 193rd or last bit position of the FIG. 16 frame and transmits the resulting frames via an electrical signal-conditioning line interface 1108 to transmission facility 421 at the 1.544-megahertz bit rate. Computer 1123, in response to instructions from the processor 66 of control unit 317, can effect the transmission of messages on the derived data link of transmission facility 421. Computer 1123 transmits a given message via bus 1125 to a message formatter 1139, which serially transmits the bits of the message on a conductor 1140 to framer 1102. Framer 1102 then inserts those message bits in the last bit position of predetermined frames on transmission facility 421 which do not include framing bits.

Data words are received from transmission facility 421 at a 1.544-megahertz bit rate in the FIG. 16 format by a receive converter 1101 which transmits the received data words to framer 1102. Receive converter 1101 also includes a clock recovery circuit (not shown) which derives a 1.544-megahertz clock signal, referred to herein as a line timing signal, and transmits that signal via a conductor 1103 to framer 1102 and receive synchronizer 1104. Framer 1102 searches the incoming data stream framing bits from receive converter 1101 to determine correct frame alignment and reports any errors to computer 1123 via a path 1128, maintenance buffer 1124 and bus 1125. To receive derived data link messages, framer 1102 also extracts bits from predetermined frames from transmission facility 421 which do not include framing bits and serially transmits the extracted bits to message formatter 1139 on a conductor 1141. Completed messages are then conveyed from message formatter 1139 to computer 1123 via bus 1125 and subsequently to the control unit 317 processor 66 via control interface 1122 and communication path 397. Framer 1102 transmits the data words received from receive converter 1101 to receive synchronizer 1104 at a bit rate of 1.544 megahertz using the line timing signal derived by receive converter 1101. Framer 1102 also uses that line timing signal to derive a superframe sync pulse defining a superframe of 24 frames from transmission facility 421. Framer 1102 transmits that superframe sync pulse to receive synchronizer 1104 on conductor 1132. Receive synchronizer 1104 includes a two-frame, elastic-store buffer (not shown). Data words from framer 1102 are shifted into this buffer at a rate determined by the line timing signal from receive converter 1101. Data words are shifted out of the buffer at a rate determined by a system timing signal from timing generator 1120. Accordingly, the data flow is converted from transmission facility 421 timing to host switching system 900 timing. Receive synchronizer 1104 uses the superframe sync pulse from framer 1102 to determine frame position within each frame, inserts the bits of the first 23 channels of each frame in the PCM bit positions of 23 of 32 channels transmitted via parallel-serial register 1105 on time-multiplexed line 341, and appropriately distributes the A-E bits of the 24 th channel from framer 1102 to those 23-channels on line 341. Receive synchronizer 1104 also inserts an idle code in the nine unused line 341 channels. In a manner similar to that for transmit formatter 1107 and line 342, the selection of the line 341 channels to be used is predetermined at system initialization by the control unit 317 processor 66 and receive synchronizer 1104 is informed of such initialization, and any subsequent changes, via maintenance buffer 1124 and a path 1127. Within host interface module 301, digital facility interfaces 322 through 328 are substantially identical to digital facility interface 321.

Host interface module 302 comprising time-slot interchange unit 312, control unit 318 and digital facility interfaces 331 through 338 is substantially identical to module 301. Control unit 318 and control distribution unit 31 exchange control messages using control channel 61 at input/output port pair P61 and control channel 62 at input/output port pair P62.

Remote Switching Module 501

Each remote switching module includes a facilities interface unit which, in the present embodiment, interfaces with the four digital transmission facilities from a host interface module and with the three digital transmission facilities from the other remote switching modules. For example, remote switching module 501 (FIG. 12) includes facilities interface unit 505 which interfaces with facilities 421 through 424 from host interface module 301 and with facilities 425, 426 and 427 from remote switching modules 502, 503 and 504, respectively. Each facilities interface unit is capable of interfacing with 20 transmission facilities but in the present exemplary embodiment only seven are used. Recall that the number of transmission facilities between a given remote switching module and host system 900 or between a given pair of remote switching modules depends on the amount of traffic anticipated therebetween. Facilities interface unit 505 multiplexes and transmits the information received on the seven transmission facilities connected thereto, in predetermined channels on a pair of 256-channel time-multiplexed lines 515 and 516 connected to a time-slot interchange unit 511 and appropriately demultiplexes and transmits information, received from time-slot interchange unit 511 on a pair of 256-channel time-multiplexed lines 513 and 514, in predetermined channels on the seven transmission facilities. Remote switching module 501 also includes a control unit 517 associated with time-slot interchange unit 511 and a plurality of line units, e.g., 519 and 520, serving subscriber sets such as sets 528 and 529. The relationship of time-multiplexed lines 513 through 516, time-slot interchange unit 511, control unit 517, line units 519 and 520 and subscriber sets 528 and 529 is substantially the same as that of time-multiplexed lines 13 through 16, time-slot interchange unit 11, control unit 17, line units 19 and 20 and subscriber sets 23 and 24.

Facilities Interface Unit 505

Figure 14:
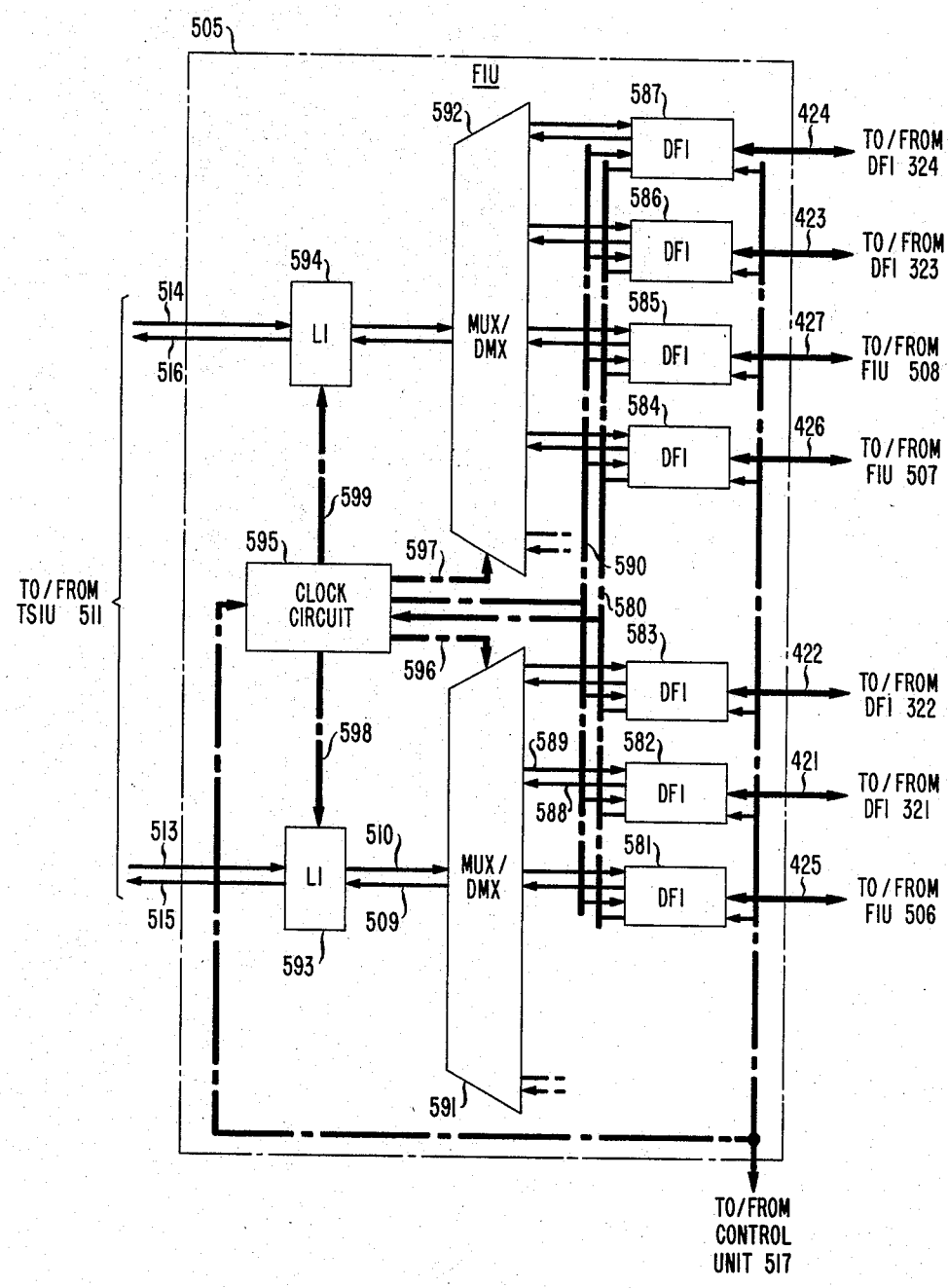
FIG. 14 is a more detailed diagram of a facilities interface unit included in the system of FIG. 10 through 12.

Facilities interface unit 505 (FIG. 14) includes seven digital facility interfaces 581 through 587 which operate under the control of control unit 517 to perform the same frame format conversion function as digital facility interface 321 described above. For example, digital facility interface 582 converts the 24-channel format (FIG. 16) on transmission facility 421 to the 32-channel format (FIG. 15) used on a pair of time-multiplexed lines 588 and 589. However, only 23 of the channels on lines 588 and 589 can be used. Each digital facility interface 581 through 587 also recovers a clock signal from the incoming bit stream on the transmission facility connected thereto and transmits that clock signal via a path 580 to a clock circuit 595. Clock circuit 595 includes a phase-locked loop oscillator (not shown) from which the various timing signals required by facilities interface unit 505 are derived. Under the control of control unit 517, clock circuit 595 receives the clock signal, referred to as the line timing signal, from a selected one of the digital facility interfaces 581 through 587 and uses that clock signal as a reference signal for the phase-locked loop oscillator. However, clock circuit 595 can also operate in a stand-alone mode wherein the phase-locked loop oscillator provides the required timing signals without a reference signal. Clock circuit 595 distributes system timing signals to digital facility interfaces 581 through 587 via a path 590, to a pair of multiplexer/demultiplexer circuits 591 and 592 via paths 596 and 597 and to a pair of link interfaces 593 and 594 via paths 598 and 599. Based on the timing signals received from clock circuit 595, multiplexer/demultiplexer circuit 591 transmits the information received from digital facility interfaces 581 through 583, on a 256-channel time-multiplexed line 509 to link interface 593. Since only 23 of the 32 channels transmitted by a digital facility interface can be used, only 69 of the 256 channels on line 509 are used to transmit the information from digital facility interfaces 581 through 583. However, multiplexer/demultiplexer circuit 591 can accommodate as many as ten digital facility interfaces, in which case 230 of the 256 channels on line 509 would be used. Circuit 591 also receives information from link interface 593 in 69 of 256 channels on a time-multiplexed line 510 and demultiplexes that information to the appropriate channels of digital facility interfaces 581 through 583. Link interface 593 is substantially identical to link interface 78 in time-slot interchange unit 11 except that the registers used to insert and extract control words are not included. Link interface 593 is used to synchronize lines 509 and 510, to insert framing bits on a 256-channel time-multiplexed line 515 and to check framing bits received on a 256-channel time-multiplexed line 513. Link interface 593 transmits information to time-slot interchange unit 511 on time-multiplexed line 515 and receives information from time-slot interchange unit 511 on time-multiplexed line 513. Lines 513 and 515 have the same relationship with respect to time-slot interchange unit 511 as lines 13 and 15 have with respect to time-slot interchange unit 11. Multiplexer/demultiplexer circuit 592 and link interface 594, which are substantially identical to multiplexer/demultiplexer circuit 591 and link interface 593, respectively, operate to transmit and receive information on 256-channel time-multiplexed lines 516 and 514. However, since circuit 592 is connected to four digital facility interfaces 584 through 587, 92 of the channels on lines 516 and 514 are used rather than 69. Note that digital facility interfaces 582 and 583 interface two transmission facilities from host interface module 301, i.e., 421 and 422, respectively, to multiplexer/demultiplexer 591 and that digital facility interfaces 586 and 587 interface the other two transmission facilities from host interface module 301, i.e., 423 and 424, respectively, to multiplexer/demultiplexer 592.

Control Communication

Figure 20:
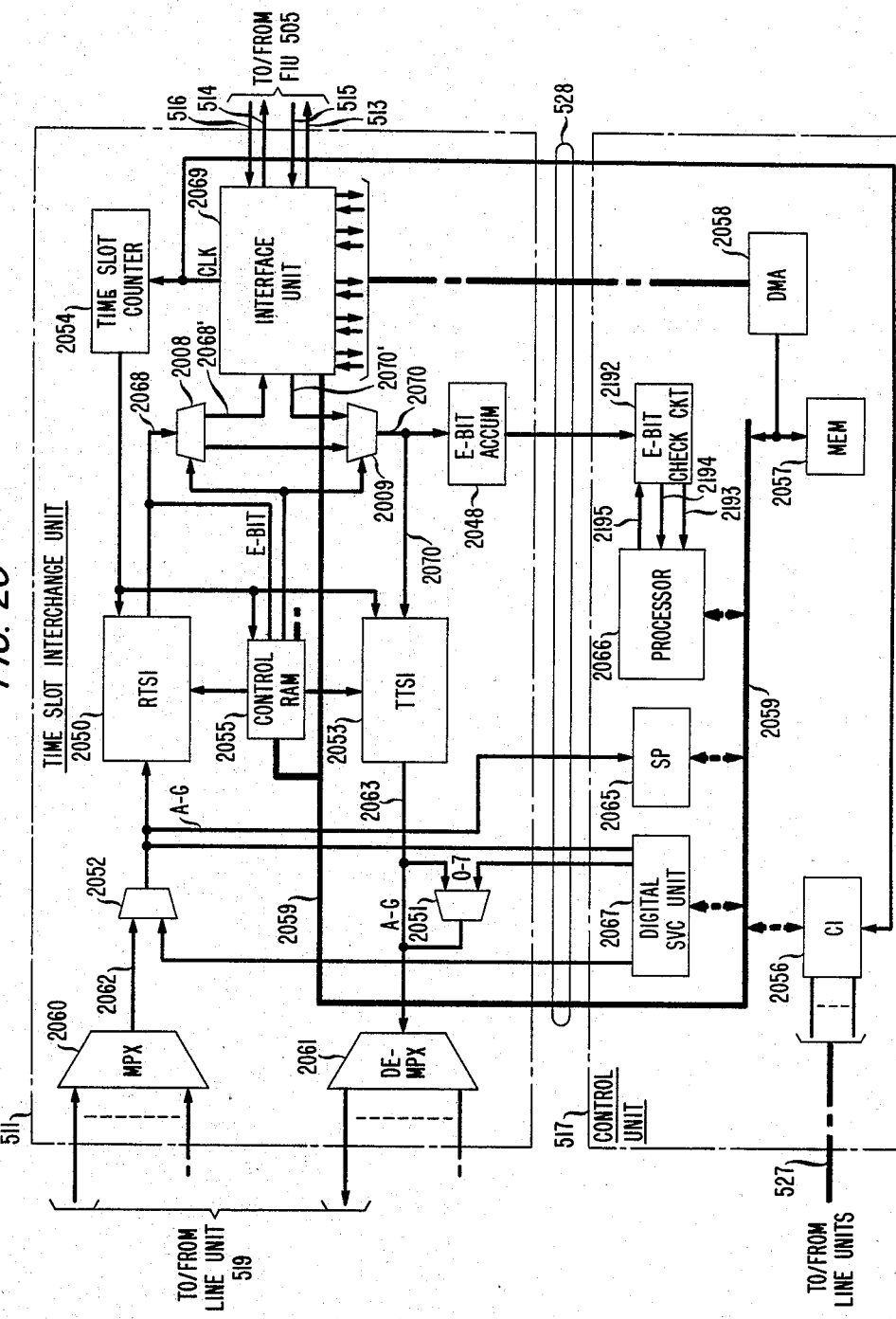
FIG. 20 is a more detailed diagram of a time-slot interchange unit included in the system of FIGS. 10 through 12.
Figure 21:
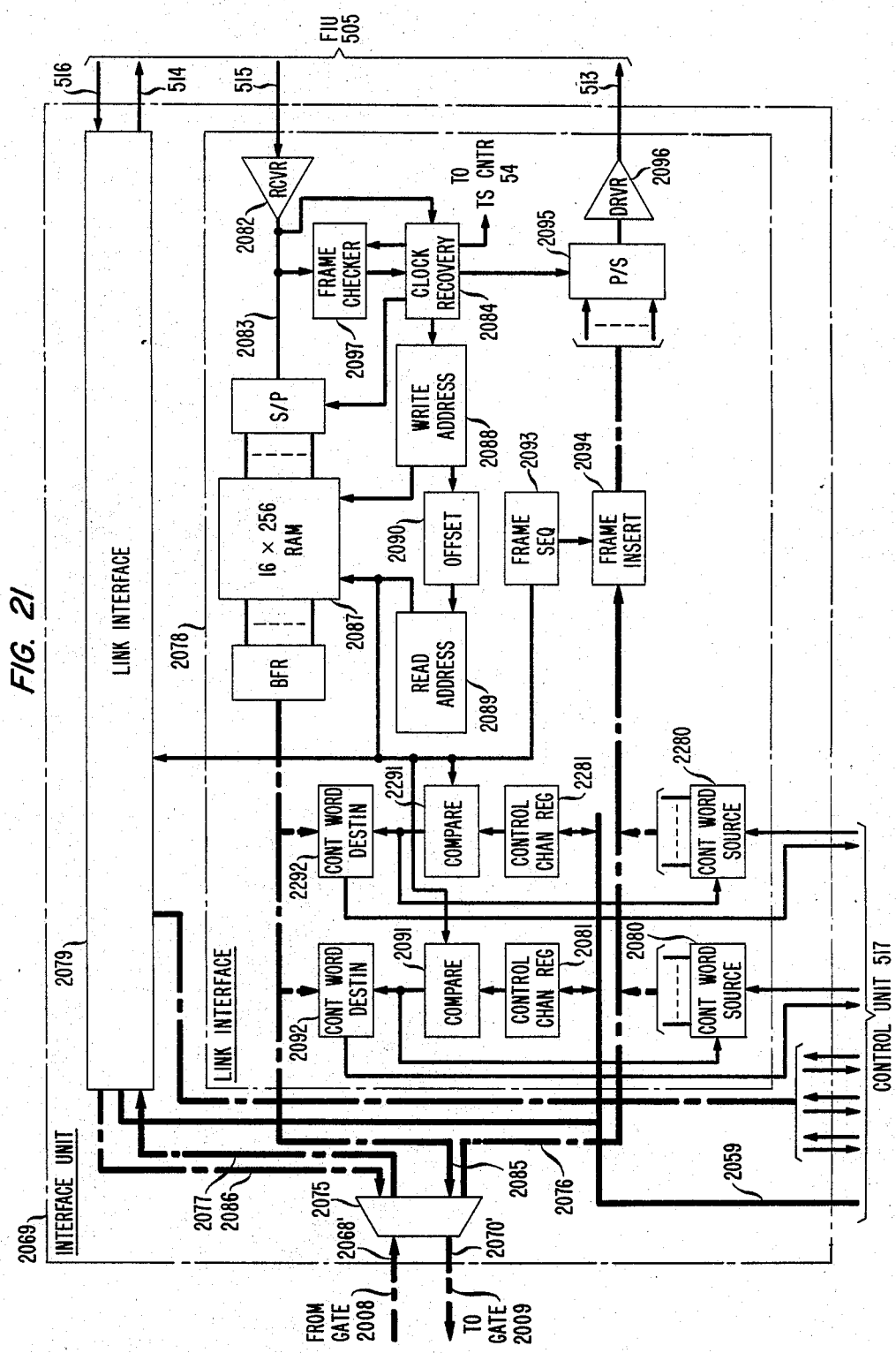
FIG. 21 is a more detailed diagram of an interface unit included in the time-slot interchange unit of FIG. 20.

Each remote switching module 501 through 504 (FIG. 12) has two control channels to control distribution unit 31. In addition, each remote switching module 501 through 504 has one control channel to each of the three other remote switching modules. Accordingly, time-slot interchange unit 511 is capable of extracting and inserting five of the channels between time-slot interchange unit 511 and facilities interface unit 505 as control channels. These five control channels are in addition to the derived data link control channels between each remote switching module and host system 900 and the derived data link control channels between remote switching modules. Time-slot interchange unit 511 and control unit 517 (FIG. 20) and an interface unit 2069 (FIG. 21) within time-slot interchange unit 511 are similar to time-slot interchange unit 11 and control unit 17 (FIG. 3) and interface unit 69 (FIG. 4) described above. In FIG. 20 and 21, the numbers designating the various components comprising time-slot interchange unit 511, control unit 517 and interface unit 2069 are exactly 2000 greater than their counterpart components within time-slot interchange unit 11, control unit 17 and interface unit 69. For example, processor 2066 in control unit 517 is substantially identical to processor 66 in control unit 17. Interface unit 2069 (FIG. 21) is similar to interface unit 69 in that each includes two link interfaces. However, whereas each of the link interfaces 78 and 79 in interface unit 69 extracts and inserts one control channel, link interface 2078 in interface unit 2069 interfaces two control channels and link interface 2079 in interface unit 2069 interfaces three control channels. For example, link interface 2078 has a first arrangement comprising control channel register 2081, comparator 2091, control word destination register 2092 and control word source register 2080 and a second arrangement comprising control channel register 2281, comparator 2291, control word destination register 2292 and control word source register 2280, each arrangement for extracting one control channel from time-multiplexed line 2085 and inserting one control channel in time-multiplexed line 2076. Both the first and second arrangements function similarly to the arrangement comprising control channel register 81, comparator 91, control word destination register 92 and control word source register 80 in interface unit 69 (FIG. 4) to extract and insert control channels. However, the control channel designation stored in control channel register 81 in interface unit 69 is fixed whereas the designations stored in control channel registers 2081 and 2281 as well as the designations stored in the control channel registers of the three similar arrangements within link interface 2079 can be changed by processor 2066 via bus 2059. In the present embodiment, one of the two control channels of link interface 2078 is used for control communication with control distribution unit 31 of host switching system 900 and the other control channel of link interface 2078 is used for control communication with remote switching module 502. Further, one of the three link interface 2079 control channels is used for control communication with control distribution unit 31 and the other two control channels are used for control communication with remote switching modules 503 and 504.

In the present embodiment, channel 1 on two of the four transmission facilities interconnecting a given remote switching module, e.g., 501, to host interface module 301 is established as a control channel. Accordingly, there are eight control channels between the cluster of remote switching modules 501 through 504 and control distribution unit 31. Central control 30 writes the appropriate instructions into control memory 29 such that channels 63 and 64 at input port P59, channels 65 and 66 at input port P60, channels 67 and 68 at input port P61 and channels 69 and 70 at input port P61 are always transmitted via output port P64 to control distribution unit 31 and such that channels 63 and 64 at input port P64 are transmitted to output port P59, channels 65 and 66 at input port P64 are transmitted to output port P60, channels 67 and 68 at input port P64 are transmitted to output port P61 and channels 69 and 70 at input port P64 are transmitted to output port P62. In this embodiment, control distribution unit 31 must be able to accommodate 70 of the 256 possible control channels at input/output port pair P64 rather than only 58 as in the control distribution unit 31 of the FIG. 2 system.

When the system is initialized, each of the digital facility interfaces 321 through 324, under the control of control unit 317, transmits a message using the derived data link on its transmission facility 421 through 424 indicating that facility 421, for example, will be used to convey one of the two control channels. Digital facility interfaces 582, 583, 586 and 587 receive these messages and, in response, inform control unit 517 via path 527 of the selected control channel. Processor 2066 of control unit 517 (FIG. 20) then transmits a designation representing the first selected control channel to control channel register 2081 (FIG. 21) for storage therein. Accordingly, the first selected control channel is thereafter extracted from time-multiplexed line 2085 by control word destination register 2092 to be subsequently read by control unit 517. Further, control words transmitted by control unit 517 for storage in control word source register 2080 are thereafter inserted in the first selected control channel of time-multiplexed line 2076. After transmitting the designation to control channel register 2081, control unit 517 then transmits an acknowledgment message via the transmission facility 421 derived data link to control unit 317 indicating that the first control channel has been established. In response to the acknowledgment message, control unit 317 writes information into the control RAM 55 of time-slot interchange unit 311 such that channel 1 of transmission facility 421 is always transmitted to input port P59 in channel 63 and channel 63 at output port P59 is always conveyed to channel 1 of transmission facility 421. This completes the establishment of the first control channel between remote switching module 501 and control distribution unit 31.

Control unit 317 then transmits a control message in its control channel 59 indicating that transmission facility 423, for example, is to be used to convey the second control channel. This control message includes a destination portion defining the first established control channel between remote switching module 501 and control distribution unit 31, i.e., control channel 63. The control message is transmitted via time-multiplexed switch 10 to control distribution unit 31, which interprets the destination portion thereof and then transmits the message via time-multiplexed switch 10 control channel 63, host interface module 301 and transmission facility 421 channel 1 to control unit 517. In response to this control message, processor 2066 of control unit 517 transmits a designation representing the second selected control channel to a control channel register (not shown) of link interface 2079 for storage therein. Accordingly, the second selected control channel is thereafter properly extracted and inserted within link interface 2079 for control message communication with control unit 517. Control unit 517 transmits an acknowledgment message via the first remote switching module 501—control distribution unit 31 control channel, i.e., via transmission facility 421 channel 1, host interface module 301 and time-multiplexed switch 10 control channel 63 to control distribution unit 31. Based on the destination portion of this acknowledgment message, control distribution unit 31 then transmits the message to control unit 317 via one of the lost interface module 301—control distribution unit 31 control channels, e.g., control channel 59, indicating that the second remote switching module 501—control distribution unit 31 control channel has been established. In response, control unit 317 writes information into the control RAM 55 of time-slot interchange unit 311 such that channel 1 of transmission facility 423 is always transmitted to input port P59 in channel 64 and channel 64 at output port P59 is always conveyed to channel 1 of transmission facility 423. This completes the establishment of the second control channel between remote switching module 501 and control distribution unit 31. The two control channels between each of the remote switching modules 502, 503 and 504 and host switching system 900 are established in a similar manner. The selected control channels on transmission facilities 431 through 434, 441 through 444 and 451 through 454 are transmitted to input port P60 in channels 65 and 66, to input port P61 in channels 67 and 68 and to input port P62 in channels 69 and 70. Further, channels 65 and 66 at output port P60, channels 67 and 68 at output port P61 and channels 69 and 70 at output port P62 are transmitted as the control channels to remote switching modules 502 through 504.

If after the establishment of transmission facility 421 channel 1 and transmission facility 423 channel 1 as the two control channels between remote switching module 501 and host switching system 900, control unit 517 of remote switching module 501 determines that, for example, transmission facility 421 has failed, control unit 517 transmits a control message indicating that failure to control unit 317. The control message is conveyed first via transmission facility 423 channel 1, host interface module 301 and time-multiplexed switch 10 control channel 64 to control distribution unit 31 and then via time-multiplexed switch 10 control channel 59 to control unit 317. In response, control unit 317 determines whether transmission facility 422, which in the present embodiment is the only other transmission facility between host switching system 900 and remote switching module 501 that is connected via a digital facility interface to multiplexer/demultiplexer 591, is operational. If transmission facility 422 is operational, control unit 317 transmits a message to control unit 517 indicating the selection of transmission facility 422 channel 1 as a control channel. The control message is conveyed first via time-multiplexed switch 10 control channel 59 to control distribution unit 31 and then via time-multiplexed switch 10 control channel 64, host interface module 301 and transmission facility 423 channel 1 to control unit 517. In response, processor 2066 of control unit 517 (FIG. 20) then transmits a designation representing transmission facility 422 channel 1 to control channel register 2081 (FIG. 21) for storage therein. In addition, control unit 317 writes information into the control RAM 55 of time-slot interchange unit 311 such that channel 1 of transmission facility 422 is thereafter transmitted to input port P59 in channel 63 and channel 63 at output port P59 is conveyed to channel 1 of transmission facility 422.

Similarly, if it is determined that both the transmission facilities used for control communication between remote switching module 501 and host switching system 900 have failed, the derived data link of the other transmission facilities therebetween can be used for control communication to coordinate the establishment of a control channel on an operational transmission facility. In the present embodiment, at least four transmission facilities are used to interconnect a given remote switching module to host switching system 900. This allows the use of two different transmission facilities to convey the two control channels with the other two transmission facilities available to convey control channels in the event of transmission facility failures.

In an alternative embodiment, when the system is initialized, each of the digital facility interfaces 321 through 324, under the control of control unit 317, transmits a message using the derived data link on its transmission facility 421 through 424 indicating that certain ones of the channels of the transmission facility 421 through 424 are candidate control channels. Digital facility interfaces 582, 583, 586 and 587 receive these messages and, in response, inform control unit 517 via path 527 of the candidate control channels. Processor 2066 of control unit 517 (FIG. 20) selects one of the candidate channels, e.g., transmission facility 421 channel 1, as a control channel and transmits a designation representing that control channel to control channel register 2081 (FIG. 21) for storage therein. Accordingly, the selected control channel is thereafter extracted from time-multiplexed line 2085 by control word destination register 2092 to be subsequently read by control unit 517. Further, control words transmitted by control unit 517 for storage in control word source register 2080 are thereafter inserted in the selected control channel of time-multiplexed line 2076. After transmitting the designation to control channel register 2081, control unit 517 then transmits a control message via the transmission facility 421 derived data link to control unit 317 defining the selected control channel. In response to this control message, control unit 317 writes information into the control RAM 55 of time-slot interchange unit 311 such that channel 1 of transmission facility 421 is always transmitted to input port P59 in channel 63 and channel 63 at output port P59 is always conveyed to channel 1 of transmission facility 421.

In accordance with this alternative embodiment, control unit 517 then selects a second one of the candidate channels and exchanges control messages with host switching system 900 via the first control channel to coordinate the establishment of the second control channel.

One of the two control communication channels established between a given remote switching module, e.g., 501, and host switching system 900 is used during the setup of calls. In the present embodiment, the decisions as to which one of the transmission facilities 421 through 424 between remote switching module 501 and host switching system 900 as well as which one of the channels of that transmission facility is to be used for a particular call are made by the processor 2066 (FIG. 20) of control unit 517. Processor 2066 maintains via bus 2059 a table of variables in memory 2057 defining the busy/idle status of each of the channels of transmission facilities 421 through 424. Central control 30 maintains a variable defining only the number of idle channels on the transmission facilities 421 through 424. Upon being informed that a call is to be set up between remote switching module 501 and host switching system 900, processor 2066 selects an idle channel for the call based on the table of memory 2057 and then updates the table by marking the selected channel as busy. Processor 2066 then informs the control entities of host switching system 900, e.g., central control 30 and control unit 17, via one of the established control channels, of the channel selected for the call.

In the present embodiment, one channel of each transmission facility directly interconnecting two remote switching modules is established as a control channel to allow direct control message communication between the two remote switching modules. When the system of FIG. 10 through 12 is initialized, control unit 517 (FIG. 20) of remote switching module 501, for example, selects one of the eight-bit channels of transmission facility 425, e.g., transmission facility 425 channel 1, as a control channel between modules 501 and 502. Control unit 517 then transmits a control message via the transmission facility 425 derived data link control channel, which control message defines transmission facility 425 channel 1 as a control channel. In response, control unit 518 of remote switching module 502 stores a channel designation defining transmission facility 425 channel 1 as a control channel in the link interface 2078 control channel register 2281 of time-slot interchange unit 512. Accordingly, information subsequently received from transmission facility 425 channel 1 is routed to control unit 518 of remote switching module 502 as control information. Control unit 518 then transmits an acknowledgment message via the transmission facility 425 derived data link to control unit 517. In response to the acknowledgment message, control unit 517 stores a designation defining transmission facility 425 channel 1 as a control channel in the link interface 2078 control channel register 2281 of time-slot interchange unit 511. Accordingly, information subsequently received from transmission facility 425 channel 1 is routed to control unit 517 of remote switching module 501 as control information. If the established control channel fails, the transmission facility 425 derived data link is used to establish a second channel selected by control unit 517 as a control channel.

In remote switching module 501, channel designations defining the established transmission facility 426 control channel and the established transmission facility 427 control channel are stored in two control channel registers (not shown) of the link interface 2079 of time-slot interchange unit 511 (FIG. 20). Accordingly, the three control channels from transmission facilities 425 through 427 are extracted and inserted to allow control unit 517 to directly communicate with control units in modules 502 through 504. Control channels are similarly established between module 502 and module 503, between module 502 and module 504 and between module 503 and module 504. For each pair of remote switching modules, one module is predefined to be responsible for the selection and establishment of control channels therebetween. An alternate means of control communication is available using the derived data link control channels on transmission facilities 425 through 427, 435, 436 and 445.

Recall that the number of transmission facilities interconnecting a given pair of remote switching modules depends on the anticipated traffic therebetween. In addition, the number of control channels between remote switching modules is similarly dependent on anticipated traffic. When two or more control channels and two or more transmission facilities are provided between a given pair of remote switching modules, the control channels are not all established on one of the transmission facilities. This minimizes the control communication disruption caused by a failure of a single transmission facility.

Although only remote switching module 501 has been described in detail above, module 502 comprising facilities interface unit 506, time-slot interchange unit 512, control unit 518 and line units 521 and 522 serving subscriber sets 538 and 539, module 503 comprising facilities interface unit 507, time-slot interchange unit 561, control unit 567 and line units 569 and 570 serving subscriber sets 548 and 549 and module 504 comprising facilities interface unit 508, time-slot interchange unit 562, control unit 568 and line units 571 and 572 serving subscriber sets 558 and 559 are substantially identical.

A condition known as glare can occur if, for example, remote switching modules 501 and 504 both attempt to establish calls using the same transmission facility 427 channel at the same time. Such a glare condition can be resolved by well-known means, for example, by designating a particular remote switching module as first choice for each channel therebetween.

Recall that the frame format used on the digital transmission facilities, e.g., 421, as shown in FIG. 16 has the E-bit of a given channel being conveyed only once every 24 frames. To allow the E-bit communication mode used for call setup in the above-described FIG. 2 system to be used in the present exemplary embodiment, the operation of host interface modules 301 and 302 and remote switching modules 501 through 504 must accommodate the FIG. 16 format having 24 frames between E-bits of a given channel. When the processor 66 of control unit 317, for example, is informed that a call is being set up on a given channel on one of the transmission facilities 421 through 424, it requests that the signal processor 65 survey the E-bits on the corresponding channel being received by the receive time-slot interchanger 50. When a logic one E-bit is detected, processor 66 writes a logic one bit in the control RAM 55 to be inserted during every occurrence of the appropriate channel being transmitted by the receive time-slot interchanger 50. Signal processor 65 continues to monitor the E-bit received by receive time-slot interchanger 50 during every 24th frame and when a logic zero is detected indicating discontinuity, the processor 66 is informed. Further, processor 66 of control unit 317 instructs the E-bit check circuit 192 to detect a logic one E-bit in a given channel received by the transmit time-slot interchanger 53 and upon such detection processor 66 writes a logic one bit in the control RAM 55 to be inserted during every occurrence of the appropriate channel being transmitted by the transmit time-slot interchanger 53. Similarly, when the processor 2066 of control unit 517, for example, is informed that a call is being set up on a given channel on one of the facilities 421 through 424, it instructs the E-bit check circuit 2192 to detect a logic one E-bit in the corresponding channel and upon such detection the check circuit 2192 is responsive to the E-bit of only every 24th frame.

In an alternative embodiment, each digital facility interface, e.g., 321, upon receiving an E-bit from the transmission facility in a given channel and having a given logic value, transmits E-bits having the given logic value in that given channel to time-slot interchange unit 311 for 24 consecutive frames.

Call Setup Example

Figure 17:
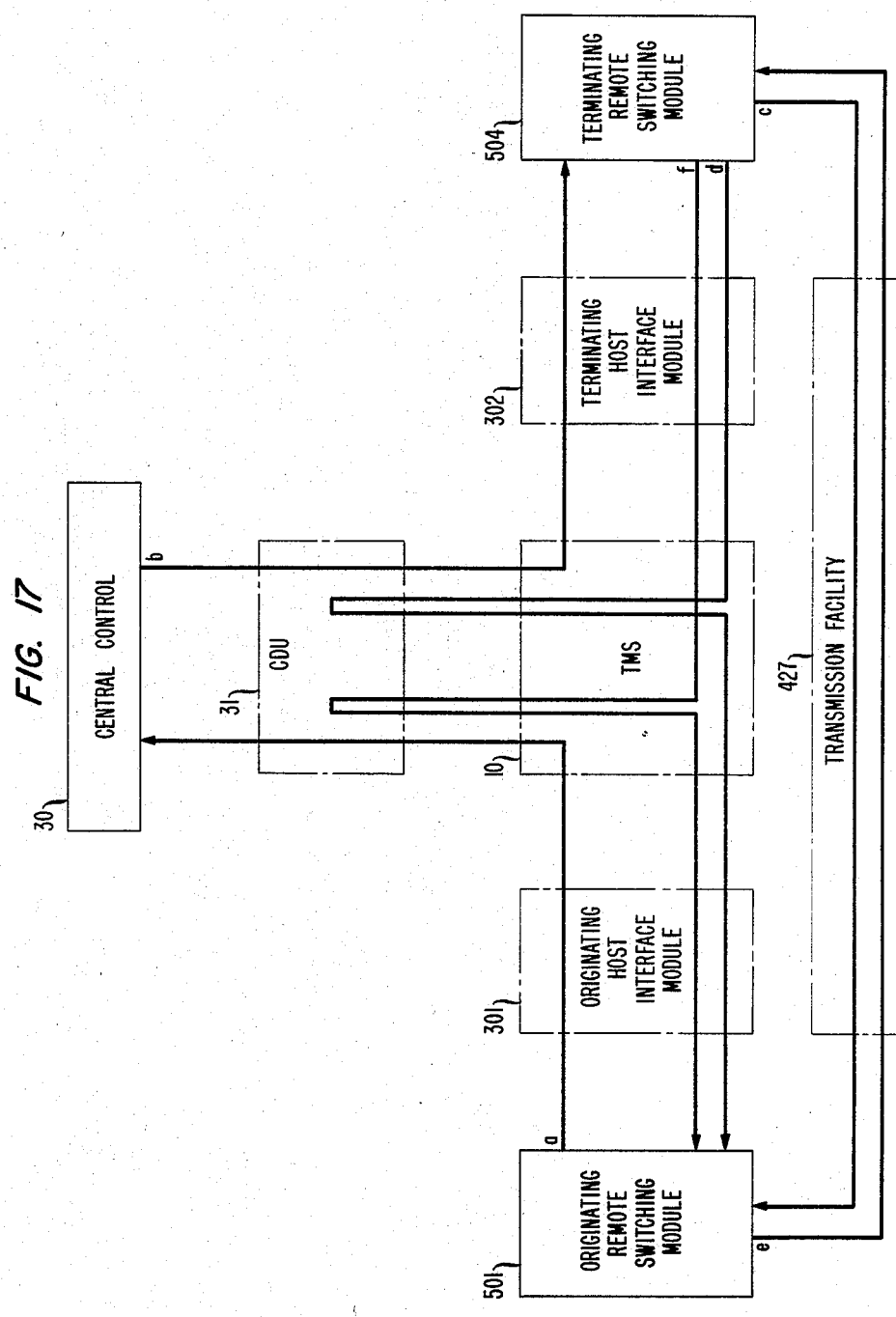
FIGS. 17 and 18 are functional diagrams of communication sequences involved in call setup in the system of FIGS. 10 through 12.

The use of the control information communication arrangement of the present exemplary embodiment to allow communication among the control entities, i.e., control units 517, 518, 567 and 568, of the cluster of remote switching modules 501 through 504 and the control entities, e.g., control units 317 and 318 and central control 30, of host system 900 may be better understood by considering the following example wherein a call is set up from subscriber set 528 to subscriber set 559. FIG. 17 is a functional diagram of the communication among control entities to set up the call on an available channel of transmission facility 427 between modules 501 and 504. In this example, it is assumed that control unit 517 exchanges control messages with control distribution unit 31 using channel 1 on transmission facility 421 and control channel 63 at input/output port pair P59 and that control unit 568 exchanges control messages with control distribution unit 31 using channel 1 on transmission facility 451 and control channel 69 at input/output port pair P62. Line unit 519 of remote switching module 501 detects an originating off-hook at subscriber set 528 and transmits a message to control unit 517 via communication path 527. Control unit 517, in response to this message from line unit 519, transmits an instruction to line unit 519 defining which communication channel between line unit 519 and time-slot interchange unit 511 is to be used for data word communication. Further, control unit 517 begins to transmit dial tone in the channel associated with the newly off-hook subscriber between time-slot interchange unit 511 and line unit 519. Control unit 517 continues to survey the DC state of subscriber set 528. Control unit 517 further detects the dialing of digits at subscriber set 528 and terminates dial tone in response to the first such digit. Based on the entire dialed number and the calling party's identity, control unit 517 formulates a control message for central control 30. This control message comprises a destination portion identifying central control 30 and further includes the calling party identity, the called party identity, and certain calling party related information, e.g., class of service. The control message (a, FIG. 17) is transmitted to control distribution unit 31 via transmission facility 421 channel 1, originating host interface module 301 and time-multiplexed switch 10 control channel 63. Control distribution unit 31 interprets the destination portion of the message received and transmits the message to central control 30.

Central control 30 determines, based upon stored information, that the called party is served by terminating remote switching module 504 and whether at least one of the 22 channels of transmission facility 427 used for conveying subscriber-generated information is presently available. (Recall that one transmission facility 427 channel is reserved as a control channel). The communication sequence required when no transmission facility 427 channel is available for the call is described later herein with reference to FIG. 18. Assuming that a transmission facility 427 channel is available, central control 30 decrements its count of available transmission facility 427 channels and transmits a control message (b) to control unit 568 of terminating remote switching module 504 defining the identity of the called party and the originating remote switching module 501 and indicating that an available transmission facility 427 channel should be used for the call. The control message (b) is conveyed first via link 32 to control distribution unit 31, and then via time-multiplexed switch 10 control channel 69, terminating host interface module 302 and transmission facility 451 channel 1 to control unit 568. In response to the control message (b), control unit 568 assigns a channel between line unit 572 and time-slot interchange unit 562 for the communication with subscriber set 559, selects an available transmission facility 427 channel, e.g., channel 13, for the call, marks transmission facility 427 channel 13 as busy in its memory 2057 and begins transmitting logic one E-bits (c) to transmission facility 427 channel 13. Control unit 568 also transmits a control message (d) to control unit 517 of originating remote switching module 501 defining the selected transmission facility 427 channel 13, the identity of terminating remote switching module 504 and any information about the called party needed for call completion. The control message (d) is conveyed first via transmission facility 451 channel 1, terminating host interface module 302 and time-multiplexed switch 10 control channel 69 to control distribution unit 31 and then via time-multiplexed switch 10 control channel 63, originating host interface module 301 and transmission facility 421 channel 1 to control unit 517. In addition to the above, the processor 2066 of control unit 568 instructs the E-bit check circuit 2192 to survey the state of the E-bits from transmission facility 427 channel 13 for a predetermined period of time, e.g., 128 frames.

Control unit 517, in response to the message (d) from control unit 568, begins to transmit logic one E-bits (e) to transmission facility 427 channel 13. Further, control unit 517 checks the E-bits from the incoming transmission facility 427 channel 13 for the presence of a logic one. When such a logic one E-bit is detected, a continuity signal is transmitted from the E-bit check circuit 2192 to the processor 2066 of control unit 517 indicating that communication path continuity from time-slot interchange unit 562 of terminating remote switching module 504 to time-slot interchange unit 511 of originating remote switching module 501 is known. When communication path continuity exists from time-slot interchange unit 511 to time-slot interchange unit 562, the E-bit check circuit 2192 of control unit 568 will detect a logic one E-bit from transmission facility 427 channel 13 during the predetermined period of time. The E-bit check circuit 2192 of control unit 568 transmits a continuity signal to its associated processor 2066 in response to the logic one E-bit. (Recall that E-bits transmitted to and received from transmission facility 427 channel 13 are actually conveyed on transmission facility 427 channel 24 during every 24th frame). In response to the continuity signal from the E-bit check circuit 2192 of control unit 568, line unit 572 is notified to transmit ring current to subscriber set 559 and audible ring tones are returned using transmission facility 427 channel 13 to subscriber set 528. When subscriber set 559 is taken off-hook, line unit 572 notifies control unit 568 which terminates the transmission of audible ring tones to subscriber set 528 and terminates the application of ring current to subscriber set 559. Control unit 568 then transmits a control message (f) to control unit 517 indicating that an answer has occurred. The control message (f) is conveyed to control unit 517 via the same channels used to convey the control message (d). The parties can now communicate using transmission facility 427 channel 13. Note that the control messages (d) and (f) could alternatively have been conveyed using the established transmission facility 427 control channel 1 or the transmission facility 427 derived data link control channel.

Figure 18:
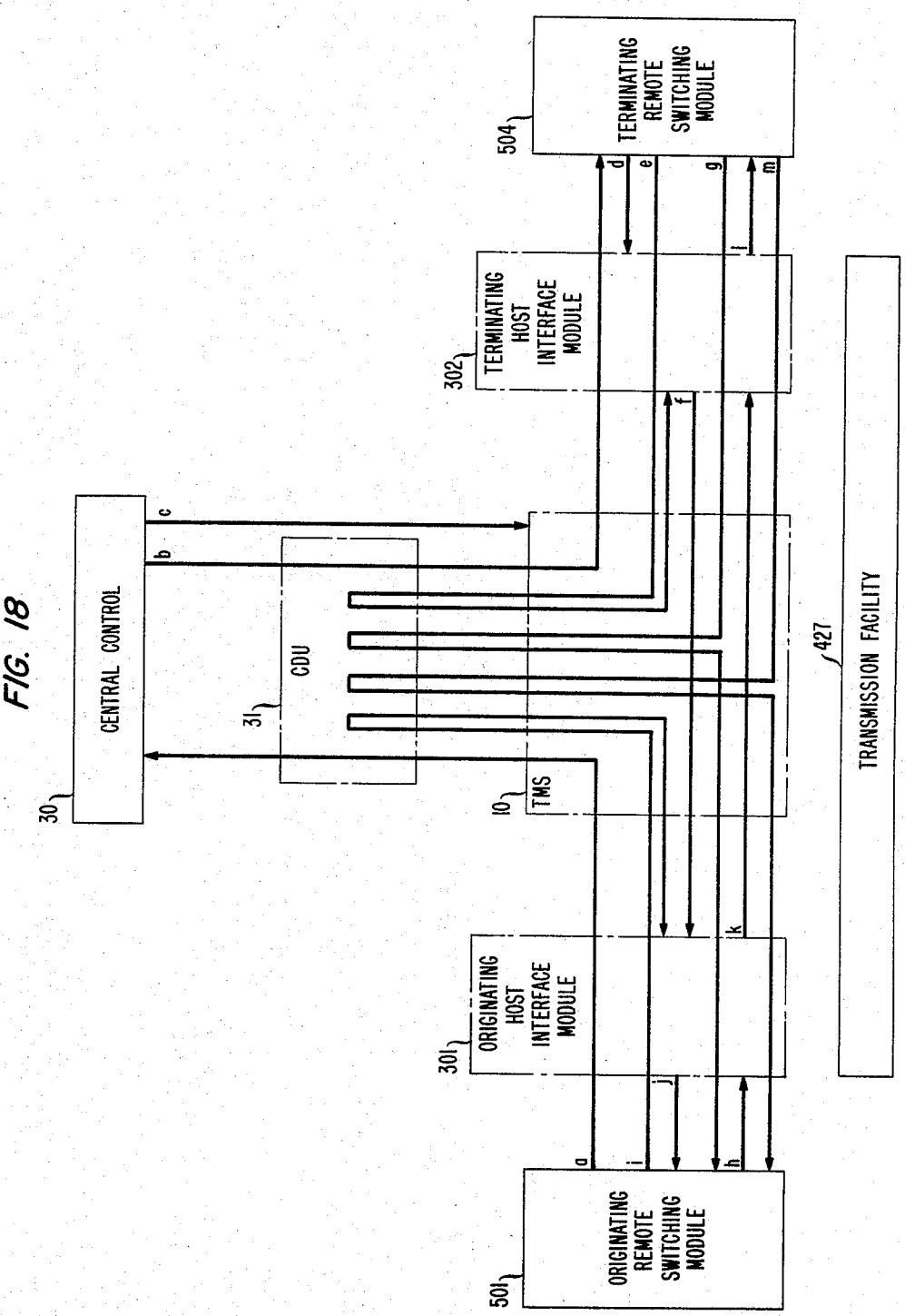

FIG. 18 is a functional diagram indicating the communication sequence required for the above-described example when no transmission facility 427 channel is available for the call. The same control message (a) as before is transmitted to central control 30. The control message (a) is conveyed first via transmission facility 421 channel 1, originating host interface module 301 and time-multiplexed switch 10 control channel 63 to control distribution unit 31 and then via link 32 to central control 30. In this case, however, central control 30 determines based on stored information that no transmission facility 427 channel is presently available for the call but that there are available channels on one of the facilities 421 through 424, on one of the facilities 451 through 454 and between one of the time-multiplexed switch 10 input/output port pairs connected to originating host interface module 301 and one of the input/output port pairs connected to terminating host interface module 302. Central control 30 then decrements its count of available channels on facilities 421 through 424 and 451 through 454 and selects a time-multiplexed switch 10 channel for the call, e.g., channel 16 between input/output port pairs P59 and P61. Central control 30 then transmits a control message (b) to control unit 568 defining the identity of the called party, the originating remote switching module 501 and the selected time-multiplexed switch 10 channel 16 and indicating that the call is to be set up via terminating host interface module 302 rather than transmission facility 427. The control message (b) is conveyed first via link 32 to control distribution unit 31 and then via time-multiplexed switch 10 control channel 69, terminating host interface module 302 and transmission facility 451 channel 1 to control unit 568. At substantially the same time that central control 30 transmits the control message (b) to control unit 568, it transmits instructions (c) to control memory 29 via communication path 49 which instructions define the time-multiplexed switch 10 switching paths to be used during channel 16 to connect modules 301 and 302. In response to the control message (b), control unit 568 assigns a channel between line unit 572 and time-slot interchange unit 562 for the communication with subscriber set 559, selects, for example, transmission facility 454 channel 19 to be used for the call and begins transmitting logic one E-bits (d) to transmission facility 454 channel 19. Control unit 568 also transmits a control message (e) to control unit 318 defining the selected transmission facility 454 channel 19 and time-multiplexed switch 10 channel 16 to be used for the call. The control message (e) is conveyed first via transmission facility 451 channel 1, terminating host interface module 302 and time-multiplexed switch 10 control channel 69 to control distribution unit 31 and then via time-multiplexed switch 10 control channel 61 to control unit 318. In response to the control message (e), control unit 318 writes instructions in the time-slot interchange unit 312 control RAM 55 such that data words received from transmission facility 454 channel 19 are transmitted in time-multiplexed switch 10 channel 16. In addition, the processor 66 of control unit 318 instructs the signal processor 65 to survey the E-bits being received from transmission facility 454 channel 19 for a predetermined period of time, e.g., 128 frames, and when a logic one E-bit is received, the processor 66 writes a logic one bit in the time-slot interchange unit 312 control RAM 55 such that time-slot interchange unit 312 begins transmitting logic one E-bits (f) in the time-multiplexed switch 10 channel 16. Processor 66 also instructs the E-bit check circuit 192 to survey the E-bits being received from time-multiplexed switch 10 channel 16 for the predetermined time period. Also in response to the control message (b), control unit 568 transmits a control message (g) to control unit 517 in originating remote switching module 501 defining the identity of the terminating remote switching module 504, the selected time-multiplexed switch 10 channel 16 and any called party information needed for call completion and indicating that the call is to be routed via originating host interface module 301 rather than transmission facility 427. The control message (g) is conveyed first via transmission facility 451 channel 1, terminating host interface module 302 and time-multiplexed switch 10 control channel 69 to control distribution unit 31 and then via time-multiplexed switch 10 control channel 63, originating host interface module 301 and transmission facility 421 channel 1 to control unit 517. In response to the control message (g), control unit 517 selects, for example, the transmission facility 421 channel 3 to be used for the call and begins transmitting logic one E-bits (h) to transmission facility 421 channel 3. Control unit 517 also transmits a control message (i) to control unit 317 of originating host interface module 301 defining the selected transmission facility 421 channel 3 and time-multiplexed switch 10 channel 16 as the channels to be used for the call. The control message (i) is conveyed first via transmission facility 421 channel 1, host interface module 301 and time-multiplexed switch 10 control channel 63 to control distribution unit 31 and then via time-multiplexed switch 10 control channel 59 to control unit 317. In response to the control message (i), control unit 317 writes instructions in the time-slot interchange unit 311 control RAM 55 such that data words received from transmission facility 421 channel 3 are transmitted in time-multiplexed switch 10 channel 16. In addition, the processor 66 of control unit 317 instructs the signal processor 65 to survey the E-bits received from transmission facility 421 channel 3 for a predetermined period of time, e.g., 128 frames, and when a logic one E-bit is detected, processor 66 writes a logic one bit in the time-slot interchange unit 311 control RAM 55 such that time-slot interchange unit 311 begins transmitting logic one E-bits (k) in time-multiplexed switch 10 channel 16. Processor 66 also instructs the E-bit check circuit 192 to survey the E-bits from time-multiplexed switch 10 channel 16 and when the first logic one E-bit (f) is detected, processor 66 writes a logic one bit in the time-slot interchange unit 311 control RAM 55 such that logic one E-bits (j) are transmitted to transmission facility 421 channel 3. When the E-bit check circuit 2192 of control unit 517 detects a logic one E-bit (j) from transmission facility 421 channel 3, it transmits a continuity signal to the control unit 517 processor 2066 indicating that communication path continuity is known from time-slot interchange unit 562 to time-slot interchange unit 511. When the E-bit check circuit 192 of control unit 318 detects the first logic one E-bit (k) from time-multiplexed switch 10 channel 16, the control unit 318 processor 66 writes a logic one bit in the time-slot interchange unit 312 control RAM 55 such that logic one E-bits (1) are transmitted to transmission facility 454 channel 19. Finally, when the E-bit check circuit 2192 of control unit 568 detects a logic one E-bit (1) from transmission facility 454 channel 19, it transmits a continuity signal to the associated processor 2066 indicating that communication path continuity is also known from time-slot interchange unit 511 to time-slot interchange unit 562. (Recall that E-bits transmitted to and received from transmission facility 454 channel 19 and transmission facility 421 channel 3 are actually conveyed in transmission facility 454 channel 24 and transmission facility 421 channel 24 during every 24th frame.) In response to the continuity signal from the E-bit check circuit 2192 of control unit 568, line unit 572 is notified to transmit ring current to subscriber set 559 and audible ring tones are returned toward subscriber set 528. When subscriber set 559 is taken off-hook, line unit 572 notifies control unit 568 which terminates the transmission of audible ring tones to subscriber set 528 and terminates the application of the ring current to subscriber set 559. Control unit 568 then transmits a control message (m) to control unit 517 indicating that answer has occurred. The control message (m) is conveyed to control unit 517 via the same channels used to convey the control message (g). The parties can now communicate via transmission facility 421 channel 3, time-multiplexed switch 10 channel 16 and transmission facility 454 channel 19. Note that the control messages (g) and (m) could alternatively have been routed via the established transmission facility 427 control channel 1 or the transmission facility 427 derived data link control channel.

Stand-alone Operation

The cluster of remote switching modules 501 through 504 is capable of integrated stand-alone operation to complete calls, for example, from subscriber set 528 to subscriber set 559 without coordination by central control 30. Upon a determination by one of the remote switching module control units, e.g., 518, that it is unable to communicate with central control 30 as, for example, when all of the transmission facilities 431 through 434 fail, it initiates a transition of the entire cluster to a stand-alone mode of operation by informing the other remote switching modules 501, 503 and 504 via the established control channel 1 of the facilities 425, 435 and 436, respectively. Upon receiving a subsequent request from subscriber set 528 to call subscriber set 559, control unit 517 transmits a control message via transmission facility 427 channel 1 informing control unit 568 of the requested call. Assuming that subscriber set 559 is not busy and that one of the transmission facility 427 channels is available for the call, control unit 568 selects an available transmission facility 427 channel, e.g., 12, and informs control unit 517 of that selection via transmission facility 427 channel 1. The call can then be completed using the selected channel 12 of transmission facility 427.

It is to be understood that the above-described exemplary embodiment is merely illustrative of the principles of the present invention and that other embodiments may be devised by those skilled in the art without departing from the spirit and scope of the invention. For example, although the system as shown in FIG. 10 through 12 includes only line units, it is to be understood that analog or digital trunk units interfacing with trunks from other telephone systems may also be included. In addition, it may be desirable to allow less than all of the remote switching modules in a cluster to operate in stand-alone mode while the others operate under the control of the host system, as in the situation where less than all the transmission facilities between the cluster and the host system fail. In that situation, traffic may be routed from a stand-alone module to the host system via one of the other modules.

What is claimed is:

1. A communication switching arrangement for establishing communication paths for calls comprising
host switching means,
first and second remote switching means,
first interconnection means for interconnecting said host switching means and said first remote switching means,
second interconnection means for interconnecting said host switching means and said second remote switching means and
third interconnection means for interconnecting said first and second remote switching means, said third interconnection means being separate and distinct from said first and second interconnection means,
wherein said first remote switching means comprises a first plurality of peripheral circuits and means for transmitting control information on said third interconnection means and
wherein said second remote switching means comprises a second plurality of peripheral circuits, means for receiving control information on said third interconnection means and means responsive to control information received on said third interconnection means for selectively establishing communication paths among said second plurality of peripheral circuits and said third interconnection means for calls between different ones of said second plurality of peripheral circuits and for calls between ones of said second plurality of peripheral circuits and ones of said first plurality of peripheral circuits.

2. An arrangement in accordance with claim 1
wherein said host switching means comprises means for transmitting control information on said first interconnection means and means for receiving control information on said second interconnection means,
wherein said first remote switching means further comprises means for receiving control information on said first interconnection means and means responsive to control information received on said first interconnection means for selectively establishing communication paths among said first plurality of peripheral circuits and said third interconnection means for calls between different ones of said first plurality of peripheral circuits and for calls between ones of said first pluraltiy of peripheral circuits and ones of said second plurality of peripheral circuits and
wherein said second remote switching means further comprises means for transmitting control information on said second interconnection means.

3. An arrangement in accordance with claim 2
wherein said host switching means further comprises means for receiving control information on said first interconnection means and means for transmitting control information on said second interconnection means,
wherein said first remote switching means further comprises means for transmitting control information on said first interconnection means and
wherein said second remote switching means further comprises means for receiving control information on said second interconnection means and means responsive to control information received on said second interconnection means for selectively establishing communication paths among said second plurality of peripheral circuits and said third interconnection means for calls between different ones of said second plurality of peripheral circuits and for calls between ones of said second plurality of peripheral circuits and ones of said first plurality of peripheral circuits.

4. An arrangement in accordance with claim 3
wherein said host switching means further comprises means responsive to control information received on said first and second interconnection means for selectively establishing communication paths between said first and second interconnection means,
wherein said first remote switching means further comprises means responsive to control information received on said first interconnection means for selectively establishing communication paths among said first plurality of peripheral circuits and said first interconnection means and
wherein said second remote switching means further comprises means responsive to control information received on said second interconnection means for selectively establishing communication paths among said second plurality of peripheral circuits and said second interconnection means.

5. An arrangement in accordance with claim 4
wherein said second remote switching means further comprises means for transmitting control information on said third interconnection means and
wherein said first remote switching means further comprises means for receiving control information on said third interconnection means and means responsive to control information received on said third interconnection means for selectively establishing communication paths among said first plurality of peripheral circuits and said third interconnection means.

6. An arrangement in accordance with claim 5
wherein said first remote switching means further comprises means for transmitting on said first interconnection means control information comprising a request to transmit subscriber-generated information between a given one of said first plurality of peripheral circuits and a given one of said second plurality of peripheral circuits and
wherein said host switching means further comprises means for storing first, second and third variables defining the availability of said first, second and third interconnection means, respectively, for transmitting subscriber-generated information, means responsive to said request, for transmitting to said first and second remote switching means, control information comprising a first command to transmit subscriber-generated information between said given one of said first plurality of peripheral circuits and said given one of said second plurality of peripheral circuits via said third interconnection means, when said third variable defines said third interconnection means as being available for transmitting subscriber-generated information and means responsive to said request, for transmitting to said first and second remote switching means, control information comprising a second command to transmit subscriber-generated information between said given one of said first plurality of peripheral circuits and said given one of said second plurality of peripheral circuits via said first and second interconnection means and said host switching means when said third variable defines said third interconnection means as being unavailable for transmitting subscriber-generated information and said first and second variables respectively define said first and second interconnection means, as being available for transmitting subscriber-generated information.

7. An arrangement in accordance with claim 6 wherein said first remote switching means further comprises means responsive to said first command for establishing a communication path between said given one of said first plurality of peripheral circuits and said third interconnection means and means responsive to said second command for establishing a communication path between said given one of said first plurality of peripheral circuits and said first interconnection means and wherein said second remote switching means further comprises means responsive to said first command for establishing a communication path between said given one of said second plurality of peripheral circuits and said third interconnection means and means responsive to said second command for establishing a communication path between said given one of said second plurality of peripheral circuits and said second interconnection means.

8. An arrangement in accordance with claim 7 wherein each of said first and second plurality of peripheral circuits comprises means for transmitting and receiving subscriber-generated information and wherein each of said first, second and third interconnection means comprises means for transmitting subscriber-generated information in a plurality of channels and means for transmitting control information in at least one control channel.

9. An arrangement in accordance with claim 8 wherein said second remote switching means further comprises means responsive to said first command for selecting an available channel of said third interconnection means and means responsive to said second command for selecting an available channel of said second interconnection means and wherein said first remote switching means further comprises means responsive to said second command for selecting an available channel of said first interconnection means.

10. An arrangement in accordance with claim 5 wherein each of said first and second plurality of peripheral circuits comprises means for transmitting and receiving subscriber-generated information and wherein each of said first, second and third interconnection means comprises means for transmitting subscriber-generated information in a plurality of channels and means for transmitting control information in at least one control channel.

11. An arrangement in accordance with claim 4 wherein said host switching means further comprises a plurality of host peripheral circuits and means responsive to control information received on said first and second interconnection means for selectively establishing communication paths among said first and second interconnection means and said plurality of host peripheral circuits.

12. An arrangement in accordance with claim 2 wherein said second remote switching means further comprises means for transmitting control information on said third interconnection means and wherein said first remote switching means further comprises means for receiving control information on said third interconnection means and means responsive to control information received on said third interconnection means for selectively establishing communication paths among said first plurality of peripheral circuits and said third interconnection means for calls between different ones of said first plurality of peripheral circuits and for calls between ones of said first plurality of peripheral circuits and ones of said second plurality of peripheral circuits.

13. An arrangement in accordance with claim 1 wherein said second remote switching means further comprises means for transmitting control information on said third interconnection means and wherein said first remote switching means further comprises means for receiving control information on said third interconnection means and means responsive to control information received on said third interconnection means for selectively establishing communication paths among said first plurality of peripheral circuits and said third interconnection means for calls between different ones of said first plurality of peripheral circuits and for calls between ones of said first plurality of peripheral circuits and ones of said second plurality of peripheral circuits.

14. An arrangement in accordance with claim 1 wherein said host switching means comprises means for transmitting and receiving control information on said first interconnection means and wherein said first remote switching means further comprises means for transmitting and receiving control information on said first interconnection means and means responsive to control information received on said first interconnection means for selectively establishing communication paths among said first plurality of peripheral circuits and said third interconnection means for calls between different ones of said first plurality of peripheral circuits and for calls between ones of said first plurality of peripheral circuits and ones of said second plurality of peripheral circuits.

15. An arrrangement in accordance with claim 14 wherein said second remote switching means further comprises means for transmitting control information on said third interconnection means and wherein said first remote switching means further comprises means for receiving control information on said third interconnection means and means responsive to control information received on said third interconnection means for selectively establishing communication paths among said first plurality of peripheral circuits and said third interconnection means.

16. An arrangement comprising
host switching means,
first and second remote switching means,
first interconnection means for interconnecting said host switching means and said first remote switching means,
second interconnection means for interconnecting said host switching means and said second remote switching means and third interconnection means for interconnecting said first and second remote switching means, said third interconnection means being separate and distinct from said first and second interconnection means, wherein said host switching means comprises means for transmitting and receiving control information on said first and second interconnection means and means responsive to control information recieved on said first and second interconnection means for selectively establishing communication paths between said first and second interconnection means, wherein said first remote switching means comprises a first plurality of peripheral circuits, means for transmitting and receiving control information on said first interconnection means and means responsive to control information received on said first interconnection means for selectively establishing communication paths among said first plurality of peripheral circuits and said first and third interconnection means, wherein said second remote switching means comprises a second plurality of peripheral circuits, means for transmitting and receiving control information on said second interconnection means and means responsive to control information received on said second interconnection means for selectively establishing communication paths among said second plurality of peripheral circuits and said second and third interconnection means, wherein said first remote switching means further comprises means for transmitting on said first interconnection means control information comprising a request to transmit subscriber-generated information between a given one of said first plurality of peripheral circuits and a given one of said second plurality of peripheral circuits and wherein said host switching means further comprises means for storing first, second and third variables defining the availability of said first, second and third interconnection means, respectively, for transmitting subscriber-generated information, means responsive to said request, for transmitting to said first and second remote switching means, control information comprising a first command to transmit subscriber-generated information between said given one of said first plurality of peripheral circuits and said given one of said second plurality of peripheral circuits via said third interconnection means, when said third variable defines said third interconnection means as being available for transmitting subscriber-generated information and means responsive to said request, for transmitting to said first and second remote switching means, control information comprising a second command to transmit subscriber-generated information between said given one of said first plurality of peripheral circuits and said given one of said second plurality of peripheral circuits via said first and second interconnection means and said host switching means, when said third variable defines said third interconnection means as being unavailable for transmitting subscriber-generated information and said first and second variables respectively define said first and second interconnection means as being available for transmitting subscriber-generated information.

17. An arrangement in accordance with claim 16 wherein said first remote switching means further comprises means responsive to said first command for establishing a communication path between said given one of said first plurality of peripheral circuits and said third interconnection means and means responsive to said second command for establishing a communication path between said given one of said first plurality of peripheral circuits and said first interconnection means and wherein said second remote switching means further comprises means responsive to said first command for establishing a communication path between said given one of said second plurality of peripheral circuits and said third interconnection means and means responsive to said second command for establishing a communication path between said given one of said second plurality of peripheral circuits and said second interconnection means.

18. An arrangement in accordance with claim 17 wherein each of said first and second plurality of peripheral circuits comprises means for transmitting and receiving subscriber-generated information, wherein each of said first and second interconnection means comprises means for transmitting subscriber-generated information in a plurality of channels and means for transmitting control information in at least one control channel and wherein said third interconnection means comprises means for transmitting subscriber-generated information in a plurality of channels.

19. An arrangement in accordance with claim 18 wherein said second remote switching means further comprises means responsive to said first command for selecting an available channel of said third interconnection means and means responsive to said second command for selecting an available channel of said second interconnection means and wherein said first remote switching means further comprises means responsive to said second command for selecting an available channel of said first interconnection means.

20. An arrangement comprising
host switching means,
first, second and third remote switching means,
first interconnection means for interconnecting said host switching means and said first remote switching means,
second interconnection means for interconnecting said host switching means and said second remote switching means,
third interconnection means for interconnecting said first and second remote switching means,
fourth interconnection means for interconnecting said host switching means and said third remote switching means,
fifth interconnection means for interconnecting said first and third remote switching means and
sixth interconnection means for interconnecting said second and third interconnection means,
said first, second, third, fourth, fifth and sixth interconnection means each being separate and distinct, and wherein said host switching means comprises means for transmitting and receiving control information on said first, second and fourth interconnection means, wherein said first remote switching means comprises a first plurality of peripheral circuits, means for transmitting and receiving control information on said first, third and fifth interconnection means and means responsive to control information received on said first, third and fifth interconnection means for selectively establishing communication paths among said first plurality of peripheral circuits and said third and fifth interconnection means, wherein said second remote switching means comprises a second plurality of peripheral circuits, means for transmitting and receiving control information on said second, third and sixth interconnection means and means responsive to control information received on said second, third and sixth interconnection means for selectively establishing communication paths among said second plurality of peripheral circuits and said third and sixth interconnection means and wherein said third remote switching means comprises a third plurality of peripheral circuits, means for transmitting and receiving control information on said fourth, fifth and sixth interconnection means and means responsive to control information received on said fourth, fifth and sixth interconnection means for selectively establishing communication paths among said third plurality of peripheral circuits and said fifth and sixth interconnection means.

21. A time division switching system comprising
first and second host-remote time-multiplexed lines,
first and second remote-host time-multiplexed lines,
first and second remote-remote time-multiplexed lines being separate and distinct from said first and second host-remote time-m:ltiplexed lines and said first and second remote-host time-multiplexed lines,
a host switching system comprising
  host switch means for selectively establishing communication paths between said first remote-host time-maltiplexed line and said second host-remote time-multiplexed line and between said second remote-host time-multiplexed line and said first host-remote time-multiplexed line and
  a host central control comprising means for transmitting control messages on said first and second host-remote time-multiplexed lines, means for receiving control messages on said first and second remote-host time-multiplexed lines and means responsive to control messages received on said first and second remote-host time-multiplexed lines for controlling said host switch means,
a first remote switching system comprising
  a first plurality of peripheral circuits,
  first remote switch means for selectively establishing communication paths among said first plurality of peripheral circuits, said first host-remote time-multiplexed line, said first remote-host time-multiplexed line and said first and second remote-remote time-multiplexed lines and
  a first remote control unit comprising means for transmitting control messages on said first remote-host and said first remote-remote time-multiplexed lines, means for receiving control messages on said first host-remote and said second remote-remote time-multiplexed lines and means responsive to control messages received on said first host-remote and said second remote-remote time-multiplexed lines for controlling said first remote switch means,
and a second remote switching system comprising
  a second plurality of peripheral circuits,
  second remote switch means for selectively establishing communication paths among said second plurality of peripheral circuits, said second host-remote time-multiplexed line, said second remote- host time-multiplexed line and said first and second remote-remote time-multiplexed lines and
  a second remote control unit comprising means for transmitting control messages on said second remote-host and said second remote-remote time-multiplexed lines, means for receiving control messages on said second host-remote and said first remote-remote time-multiplexed lines and means responsive to control messages received on said second host-remote and said first remote-remote time-multiplexed lines for controlling said second remote switch means.

22. A communication switching arrangement for establishing communication paths for calls comprising:
host switching means,
an N-plurality of remote switching means, N being a positive integer greater than one,
a plurality of first transmission facilities for interconnecting said host switching means and said N-plurality of remote switching means,
a plurality of second transmission facilities for interconnecting each of said N-plurality of remote switching means to the N-1 other ones of said N-plurality of remote switching means, said second transmission facilities being separate and distinct from said first transmission facilities,
wherein each said remote switching means comprises a plurality of peripheral circuits, means for transmitting control information on said second transmission facilities, means for receiving control information on said second transmission facilities, and means responsive to control information received on a given one of said second transmission facilities for selectively establishing communication paths among said plurality of periphbral circuits and said given one of said second transmission facilities for calls between different ones of said plurality of peripheral circuits and for calls between ones of said plurality of peripheral circuits and ones of the plurality of peripheral circuits of the one of said N-plurality of remote switching means interconnected to said each remote switching means by said given one of said second transmission facilities.

23. An arrangement in accordance with claim 22 wherein each said remote switching means further comprises
at least first and second time-multiplexed lines,
a time-slot interchange unit comprising means for selectively transmitting information received from said peripheral circuits on said first time-multiplxed line, and means for selectively transmitting information received on said second time-multiplexed line to said peripheral circuits and
a facilities interface unit comprising means for demultiplexing information received on said first time-multiplexed line, to at least one of said first transmission facilities and to at least the N-1 second transmission facilities to the N-1 other ones of said N-plurality of remote switching means, and means for multiplexing information received from said at least one of said first transmission facilities and from said at least the N-1 second transmission facilities to the N-1 other ones of said N-plurality of remote switching means, onto said second time-multiplexed line.

* * * * *